United States Patent [19]
Goodall et al.

[11] Patent Number: 5,677,405
[45] Date of Patent: Oct. 14, 1997

[54] HOMOPOLYMERS AND COPOLYMERS OF CATIONICALLY POLYMERIZABLE MONOMERS AND METHOD OF THEIR PREPARATION

[75] Inventors: Brian Leslie Goodall, Akron; Lester Howard McIntosh, III, Cuyahoga Falls; Dennis Allen Barnes, Medina, all of Ohio

[73] Assignee: The B.F. Goodrich Company, Richfield, Ohio

[21] Appl. No.: 448,961

[22] Filed: May 24, 1995

[51] Int. Cl.$^6$ .............................. C08F 232/02; C08F 4/82
[52] U.S. Cl. ..................... 526/281; 526/282; 526/283; 526/259; 526/268; 526/332; 526/339; 526/340; 526/120; 526/133; 526/134; 526/160; 526/169.1; 526/171; 526/250; 528/354; 528/357; 528/392
[58] Field of Search ......................... 526/281, 259, 526/282, 283, 284; 528/354, 357, 392

[56] References Cited

U.S. PATENT DOCUMENTS

| | | | |
|---|---|---|---|
| 2,721,189 | 10/1955 | Anderson et al. | 526/281 |
| 3,299,017 | 1/1967 | Zelinski et al. | 526/119 |
| 3,330,815 | 7/1967 | McKeon | 526/171 |
| 4,599,391 | 7/1986 | Yamamoto et al. | 526/282 |
| 5,087,677 | 2/1992 | Brekner et al. | 526/160 |
| 5,344,900 | 9/1994 | Maezawa et al. | 526/160 |
| 5,468,819 | 11/1995 | Goodall et al. | 526/171 |
| 5,498,677 | 3/1996 | Weller et al. | 526/133 |
| 5,602,219 | 2/1997 | Aulbach et al. | 526/160 |

FOREIGN PATENT DOCUMENTS

| | | |
|---|---|---|
| 0445755 | 9/1991 | European Pat. Off. . |
| 0504418 | 9/1992 | European Pat. Off. . |
| 0610813 | 8/1994 | European Pat. Off. . |
| 1361677 | 4/1964 | France . |
| 41-19913 | 11/1966 | Japan . |
| 43-6059 | 11/1968 | Japan . |
| 43-27417 | 11/1968 | Japan . |
| 44-19543 | 8/1969 | Japan . |
| 46-34089 | 10/1971 | Japan . |
| 445113 | 2/1992 | Japan . |
| 2244276 | 11/1991 | United Kingdom . |
| 9514048 | 5/1995 | WIPO . |

OTHER PUBLICATIONS

Hawley's Condensed Chemical Dictionary, 11th Ed, Van Nostrand Reinhold New York, 1987, 854.
"Preparation and Reactivity Studies of Highly Versatile, Nickel–Based Polymerization Catalyst Systems" by T.J. Deming and B.M. Novak, *Macromolecules* 1993, 26, 7089–7091.
"The Organic Chemistry of Nickel" by P.W. Jolly and G. Wilke, vol. 1, Academic Press, New York, p. 352 (1974).
J. of Polymer Science, Part C 1b, p. 2525 (1967) by L. Porri, G. Natta and M.C. Gallazzi.
"Copolymers of Ethylene with Bicyclic Dienes" by Schnecko et al *Die Angewandte Makromolekulare Chemie*, 20, 141–152 (1971).
Chim. Ind. (Milan) by L. Porri, G. Natta and M.C. Gallazzi, 46 428 (1964).
Stud. Surf. Sci. Catal. 56 425 (1990) by W. Kaminsky et al.
Makromol. Chem. Macromol. Symp. 47 83 (1991) by W. Kaminsky et al.
J. Mol. Cat. 74 109 (1992) by W. Kaminsky et al.
Shokubai 33 536 (1991) by W. Kaminsky.
"Polypropylene and Other Polyolefins Polymerization and Characterization" by Ser van der Ven—Studies in Poymer Science—7, Elsevier (1990), pp. 71–84.
J. of Organometal. Chemistry by A. Sen, T. Lai and R. Thomas 358 567–568 (1988).
Makromol. Chem., Rapid Commun. 12, 255–259 (1991) by C. Mehler and W. Risse, "The Pd (II) Catalyzed Polymerization of Norbornene".
Makromol. Chem. Rapid Commun. 13, 455–459 by C. Mehler and W. Risse, "The Pd (II) Catalyzed Polymerization of Norbornene Derivatives".
"Olefin Metathesis" by K.J. Ivin, Academic Press (1983), 289–293.
Makromol. Chem. 139 73 (1970) by R. Sakata et al, "Effect of Unsaturated Hydrocarbons on the Polymerization of Butadiene, etc.".
"Synthesis and Characterization of Poly(5–alkyl–2–norbornene)s by Cationic Polymerization" by T. Sagane et al Macromol. Chem. 194 37–52 (1993).
"Zietschrift fur Kristallographic" 201 287–289 (1992) by R. Kempe and J. Sieler.
Encyclopedia of Polymer Science and Engineering, 2nd Ed., vol. 2, John Wiley & Sons (1985).
"Cycloolefin–Copolymers: A New Class of Transparent Thermoplastics" by H. Cherdron, M.–J. Brekner, F. Osan, Die Angew. Chem. 223, 121–133 (1994).

*Primary Examiner*—Mark Nagumo
*Attorney, Agent, or Firm*—Nestor W. Shust; Thoburn T. Dunlap

[57] ABSTRACT

The invention discloses methods of preparing copolymers from norbornene-type monomers and cationically polymerizable monomers or polymers from catalytically polymerizable monomers by employing Group VIII transition metal ion source in a solvent for said monomers at a temperature in the range from $-100°$ C. to $120°$ C. Also disclosed are copolymers from norbornene-type monomers and catalytically polymerizable monomers.

15 Claims, No Drawings

HOMOPOLYMERS AND COPOLYMERS OF CATIONICALLY POLYMERIZABLE MONOMERS AND METHOD OF THEIR PREPARATION

BACKGROUND OF THE INVENTION

There are four types of polymerizations known in polymer chemistry: cationic, free radical, anionic and coordination anionic (Ziegler-Natta) type of polymerizations. All of them have certain advantages and disadvantages and they are known to polymerize certain types of monomers. Yet there are certain limitations that each type of polymerization possesses and there are certain monomer combinations which cannot be copolymerized by any known catalyst system.

Many monomers, including olefins, dienes, functional olefins and cyclic ethers, may be polymerized by cationic polymerization but many such monomers yield polymers of only low molecular weights. Only a limited number of monomers can be polymerized to high molecular weights and those must be polymerized at very low temperatures, such as down to $-100°$ C. Free radical initiators may be used to polymerize vinyl monomers such as vinyl chloride and acrylic acid, ethylene, TFE to give such polymers as polyvinylchloride, polyacrylic acid, polystyrene, low density polyethylene, poly TFE, and the like. Anionic polymerization is used to polymerize dienes, styrene, acrylates and ring opening polymerizations such as epoxides while Ziegler-Natta catalysis (coordination anionic polymerization) is used to polymerize olefins, dienes and cyclic olefins, but functional monomers poison such catalysts.

This invention deals with a novel polymerization mechanism, coordination cationic. The use of coordination cationic catalysts provides novel methods for the preparation of some well known polymers, such as the polymerization of cationically polymerizable monomers including olefins, isoolefins, branched $\alpha$-olefins, conjugated olefins, bicyclo olefins, vinyl ethers, cyclic ethers, lactones and N-vinyl carbazole as well as the preparation of various novel copolymers containing norbornene-type, or NB-type, monomers, i.e., polymers characterized by containing a repeating unit resulting from an addition polymerized derivative of bicyclo [2.2.1]hept-2-ene. Addition polymerization of NB may be illustrated as follows

It should be noted that the repeating unit of an addition polymerized NB-type monomer does not contain a C=C unsaturation. Such polymer structures are known to possess better thermal properties as compared to polymer chains which possess repeating units which contain a C=C unsaturation. The addition polymerization should be contrasted with ring opening metathesis polymerization ("ROMP") of NB which may be represented as follows

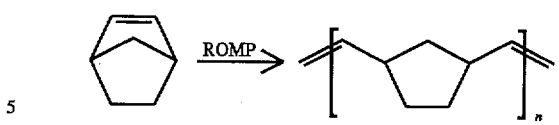

The repeating units of ROMP polymerization contain the C=C unsaturation in the polymer chains.

Although cyclic olefin monomers such as norbornene (NB) have been polymerized long ago (U.S. Pat. Nos. 2,721,189 and 3,330,815), the resulting addition polymers were obtained only in low molecular weights. There have been reported very few copolymers of NB-type monomers with non-NB comonomers. In the early 1980's, Mitsui Sekka developed tetracyclododecene/ethylene copolymers using homogeneous vanadium catalysts but such catalysts suffer from a number of limitations, including low catalyst activities and significant oligomeric fractions. They also prepared NB/ethylene copolymers with zirconocene catalysts.

Okamoto et al. disclose that the use of a nickel catalyst as a transition metal is equivalent to zirconium. Okamoto et al. teach the production of a high mol wt. norbornene polymer with a three-component catalyst system in example 117 on page 46 of EP 504,418A. The three-component catalyst was made in situ by combining triisobutylaluminum; dimethylanilinium tetrakis(pentafluorophenyl)borate; and, $Ni(acac)_2$ in toluene. The polymer recovered had a Mw=$1.21 \times 10^6$ and a mol wt. distribution of 2.37. Though essentially the entire specification is directed to the copolymerization of cycloolefins with $\alpha$-olefins using zirconium-containing catalysts, Okamoto et al. did not react norbornene and $\alpha$-olefin with a nickel catalyst. Nowhere in the '418A specification is there a teaching that the use of an $\alpha$-olefinic CTA will control molecular weight. There is no teaching of a polymer with a terminal olefinic end-group. Nor is there any teaching that an $\alpha$-olefin would do anything but copolymerize. In EP 445, 755A, Maezawa et al disclose the preparation of polynorbornene using a two-component catalyst system consisting of a transition metal compound and aluminoxane.

Japanese Patent Application No. 4-45113 (Kokai), published Feb. 14, 1994, discloses the preparation of copolymers of NB and styrene, alkylstyrenes and halostyrenes using a Ni catalyst and an aluminoxane. Apparently some ring opening polymerization of norbornene does occur. Interestingly, the 4-45113 patent application does not suggest that NB can be polymerized with any other monomers and even with regard to the styrenes, it does not include $\alpha$-methylstyrene, alkoxystyrenes such as para-methoxystyrene (vinyl anisole) and para-dimethylaminostyrene. As far as polymerizations are concerned, there is a substantial difference between different types of styrenes.

In contrast to many of the monomers polymerized by the catalysts of the present invention such as the isoolefins, the vinyl ethers and N-vinylcarbazole which can only be polymerized via cationic methods, styrene can be polymerized via many different pathways. Commercially most polystyrene is produced by free radical polymerization, although some polymers and block copolymers with narrow molecular weight distribution are synthesized by living anionic polymerization. Recently advances in the area of homogeneous Ziegler-Natta ("coordination anionic") polymerization has resulted in the industrial production of syndiotactic polystyrene using soluble titanium catalysts in combination with methaluminoxane. Cationic polymerization of styrene has hitherto been limited to the production of ill-defined resins. If cationic polymerization of styrene could be controlled such that well-defined polystyrenes could be produced it would open up new routes to block and graft copolymers, as well as opening up routes to novel compositions such as block and graft copolymers of styrene and isobutylene or styrene and butadiene.

Using the catalysts of the present invention ("coordination cationic polymerization"), it is possible to control the copolymerization of styrene with other "cationic monomers" to an unprecedented degree allowing the preparation of a wide variety of new, high molecular weight polymers such as the copolymers with norbornenes without any ring-opening polymerization of the norbornene units (which would give rise to olefinic unsaturation and allylic hydrogens in the polymer backbone resulting in low thermal and oxidative stability). Furthermore, due to the nature of this new area of coordination cationic catalysis, it is possible to (co-) polymerize styrenes which are simply not polymerizable using Ziegler-Natta catalysts, that is, α-methylstyrene, para-methoxystyrene (vinyl anisole) and para-dimethylaminostyrene, with NB.

Another class of monomers which are polymerizable via a number of different routes are the conjugated dienes such as butadiene and isoprene. The benefits of using the new catalysis of the present invention is in the control of the copolymerization of these diene monomers with other "cationic monomers". Examples include the copolymerization with isobutylene to afford higher molecular weight copolymers than are achievable with conventional cationic initiators and the copelymerization with norbornene monomers to afford novel copolymer compositions.

SUMMARY OF THE INVENTION

It is a general object of this invention to provide a novel method to make NB-type copolymers with cationically polymerizable olefinic monomers (for brevity hereinafter, "cationic olefin monomers" or "cationic olefins"), cyclic ethers and lactones or homo- or copolymers of cationic olefins and N-vinylcarbazole, without any NB comonomer, as more specifically pointed out and described hereafter.

It is a specific object of this invention to provide for a method for preparing copolymers of NB-type monomers with cationically polymerizable olefinic monomers.

It is another object of this invention to make novel copolymers of NB-type monomers and cationic olefins which cannot be prepared by any other known method.

And yet another object of the invention is homopolymerization or copolymerization of known cationically polymerizable olefinic monomers by a novel process which provides a number of advantages over the prior art methods of polymerization.

These and other objects of this invention may be accomplished by conducting polymerizations of the above noted monomers in the presence of a single or multi-component catalyst system containing a Group VIII transition metal ion source.

DETAILED DESCRIPTION OF THE INVENTION

The present invention is directed to methods of preparing certain classes of polymers and to certain novel copolymers.

One method is for preparing a polymer from:
a) 0 to 99.9 percent by weight of at least one norbornene-type monomer, and
b) 0.1 to 100 percent by weight of at least one cationically polymerizable monomer.

Another method is for preparing homopolymers and copolymers from cationically polymerizable monomers.

This category of polymers includes the industrially important class of polymers often referred to as polybutene family of polymers. Such polymers cover the isobutylene group which includes butyl rubber and the polyisobutylene group which may be low molecular weight or high molecular weight.

Normally, to prepare the polybutene family of polymers, and especially butyl rubber, high purity monomers, and especially isobutylene, are required. The catalysts of this invention, however, can tolerate a higher level of impurities and for this reason the method of this invention is more economical. Furthermore, one of the most important parameters for setting physical properties of these polymers is molecular weight. Another common trait of these materials, except for poly(1-butene), is that molecular weight is strongly determined by the polymerization temperature—very low temperatures ($\approx-100°$ C.) give high molecular weight and higher temperatures ($\approx-20°$ C.) yield low molecular weight. Again, the method of this invention represents a substantial improvement in the state of the art because using the catalyst systems of this invention such polymers, and especially polyisobutylene (PIB), may be prepared at substantially higher temperatures, for example, at from about $-50°$ C. to $10°$ C. and preferably between $-40°$ C. and $-10°$ C.

PIB is generally manufactured in a halogenated solvent, such as methyl chloride. Although such solvents may also be employed in the method of this invention, the great advantage of this invention is that high molecular weight butyl rubber may also be prepared in a hydrocarbon solvent, such as cyclohexane, hexane, and the like. This is an important advancement in the art because it eliminates the need to use environmentally unfriendly halogenated solvents.

Butyl rubber can be made from a mixture of monomers containing 98–99.6 weight percent of isobutylene and 0.4 to 2.0 weight percent of isoprene. Low molecular weight polyisobutylene is generally made at a temperature between $-10°$ C. and $-40°$ C., but employing the process of this invention it can be made at a temperature between $20°$ C. and $-10°$ C. The high molecular weight polyisobutylene can be made employing the process of this invention at temperatures between $-50°$ C. and $10°$ C. and preferably between $-40°$ C. and $10°$ C., in contrast to temperatures around $-100°$ C. required by the prior art processes.

Still another method is for preparing a copolymer from
a) 0.1 to 99.9 weight percent of at least one norbornene-type monomer, and
b) 0.1 to 99.9 weight percent of at least one cationically polymerizable monomer.

Yet another method is for preparing a copolymer from
a) 0.1 to 99 weight percent of an aromatic olefin,
b) 1 to 99 weight percent of a norbornene-type monomer, and
c) 1 to 99.9 weight percent of a cationically polymerizable monomer.

Another method is for preparing polymers from one or more cationically polymerizable monomers.

The above listed methods are carried out by employing an effective amount of a single component or a multicomponent catalyst system containing a Group VIII transition metal ion source and the polymerization is conducted in a solvent for the monomers at a temperature in the range from about $-100°$ C. to $120°$ C.

In combination with the catalyst systems of this invention in the various methods mentioned above for preparing various homopolymers and copolymers, one may also employ a predetermined amount of a chain transfer agent (CTA). A further component that may be used with these catalysts is an methaluminoxane compound.

The catalyst systems employed in this invention are remarkable in that they do not require the use of purified monomers since the catalysts are much less sensitive to the presence of organic or protic impurities than the catalysts of the prior art. This feature is unlike that of catalysts containing other transition metals, such as zirconocene, hafnocene and titanocene catalysts, which are well known to be totally ineffective in the presence of even trace amounts of water, as low as 10 ppm, and sensitive to a wide variety of reactive functions requiring expensive purification of the monomers. The catalysts employed in this invention need to be used only under "essentially anhydrous" conditions, which is meant that there be no more than 1% by weight of moisture present in the polymerization reaction mixture, and preferably less than 0.1%.

A further method of this invention is for preparing a copolymer from
   a) 1 to 99 weight percent of at least one norbornene-type monomer, and
   b) 1 to 99 weight percent of an aromatic olefin.

This method is carried out similarly as the above methods in the presence of the same single or multicomponent catalyst systems, in a solvent for monomers at a temperature between −100° C. and 120° C. A CTA may also be employed. However, the organoaluminum component that may also be employed in the preparation of the NB-type/aromatic olefin copolymers is other than methaluminoxane.

The present invention is also directed to a number of novel compositions.

One such novel composition is a copolymer containing repeating units derived from
   a) 0.1 to 99.9 weight percent of at least one norbornene-type monomer, or 5 to 50 weight percent or 40 to 90 weight percent of NB-type, and
   b) 0.1 to 99.9 weight percent of at least one cationically polymerizable monomer, or 50 to 95 weight percent or 10 to 60 weight percent of such monomer(s).

In these copolymers the NB-type monomers undergo addition type polymerization (contrasting from the ting opening type) to give repeating units which are devoid of the C=C unsaturation. These repeating units endow the resulting polymers with high glass transition temperature and good thermal and oxidative stability.

The above described polymers are preferred when NB-type monomer is used in the amount from about 50 to about 90 weight percent and most preferably from 50 to 80 weight percent. Such polymers are preferred because the high level of NB gives the resulting polymers high glass transition (heat distortion) temperature and the cationically polymerizable monomers bestow good processability and transparency.

Another novel composition is a copolymer containing repeating units derived from
   a) 1 to 99 weight percent of a norbornene-type monomer, or 5 to 25 weight percent or 40 to 90 weight percent of NB-type,
   b) 1 to 99.9 weight percent of a cationically polymerizable monomer, or 25 to 75 weight percent or 5 to 50 weight percent of such monomer(s), and
   c) 0.1 to 99 weight percent of an aromatic olefin or 5 to 70 weight percent or 1 to 55 weight percent of this class of monomer(s).

Still another novel composition is a copolymer containing repeating units derived from
   a) 0.1 to 99.9 weight percent of at least one norbornene-type monomer or 5 to 50 weight percent or 40 to 90 weight percent of NB-type, and
   b) 0.1 to 99.9 weight percent of an aromatic olefin selected from the group consisting of α-methylstyrene, para-methoxystyrene and para-N,N-dimethylaminostyrene or 50 to 95 weight percent or 10 to 60 weight percent of one or more of these monomers.

These novel compositions can be prepared by the methods described herein. In these novel compositions obtained from polymerizing NB-type monomers, the coordination cationic catalysts yield polymers which contain repeating units resulting from substantially exclusive addition type polymerization of NB-type monomers.

The catalysts which are useful in the process of this invention in preparing the various polymers of this invention fall into two categories as more specifically described below.

Single Component Catalysts

The pre-formed single component organometal complex catalyst is represented by

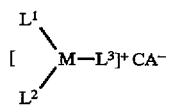

Structure I wherein,

M represents a Group VIII metal, preferably a metal selected from the group consisting of Ni and Pd; and $L^1$, $L^2$, and $L^3$ represent ligands, which separately, or, two, or all three together, provide up to three (3) π-bonds and a single metal-C σ-bond to M; and $L^1$, $L^2$, and $L^3$ may each be the same, or different, and when different, provide three individual ligands; or, two of the three ligands may be portions of an individual ligand; or, all three ligands may be portions of the same ligand; and, CA⁻ represents a weakly coordinating counter anion chosen to solubilize the cation in an inert, that is, non-reactive, cosolvent for all reactants.

The phrase "compatible weakly coordinating anion" refers to an anion which is only weakly coordinated to the cation, thereby remaining sufficiently labile to be displaced by a neutral Lewis base. More specifically the phrase refers to an anion which when functioning as a stabilizing anion in the catalyst system of this invention does not transfer an anionic substituent or fragment thereof to the cation, thereby forming a neutral product. Compatible anions are anions which are not degraded to neutrality when the initially formed complex decomposes.

The reaction mixture most preferably consists of a single phase which may include a colloidal solution. Alternatively, the reaction may be effected in a heterogeneous system with a heterogeneous catalyst, illustrated in particular by one anchored to an "active" support such as aluminum fluoride to control the morphology of the polymer formed.

The single component catalyst consists essentially of (i) a cation of said organo"M" complex which most preferably consists of a single "M", preferably Ni or Pd atom, and (ii) a weakly coordinating counteranion; the cation has a hydrocarbyl group directly bound to "M" by a single metal-C σ bond, and also by at least one, but no more than three π-bonds. By hydrocarbyl is meant a group that is capable of stabilizing a Group VIII metal complex by providing a carbon-metal σ bond and at least one or more olefinic π bonds that may be conjugated or non-conjugated, or aromatic rings. Representative hydrocarbyl groups are ($C_3$–$C_{20}$) alkenyl groups which may be, non-cyclic monocyclic or polycyclic and can be substituted with branched and unbranched ($C_1$–$C_{20}$) alkoxy, ($C_6$–$C_{15}$) aryloxy or halo groups. Optionally, the cation is bound to a weakly coordinating neutral donating ligand by not more than two π-bonds or an aromatic ring. This complex cation most preferably consists essentially of (i) a single allyl ligand, or, a canonical form thereof, which provides a σ-bond and a π-bond; or, (ii) a compound providing at least one olefinic π-bond to the metal, and a σ-bond to the metal from a distal C-atom, spaced apart from either olefinic C-atom by at least two carbon—carbon single bonds. The weakly coordinating neutral ligand is preferably a chelating bidentate cyclo($C_6$–$C_{12}$) diolefin, for example cyclooctadiene ("COD") or dibenzo COD, or an aromatic compound such as benzene, toluene, xylene, or mesitylene.

Embodiment (i) of the complex cation is illustrated by:

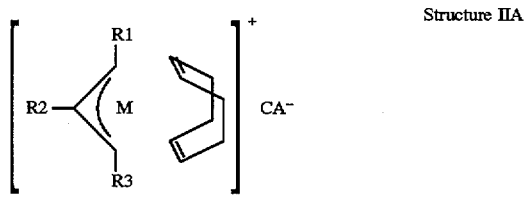

Structure IIA

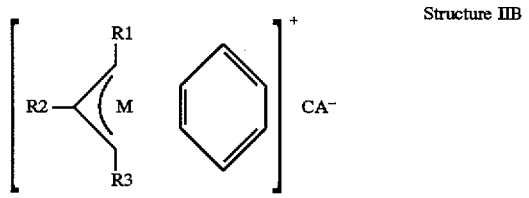

Structure IIB

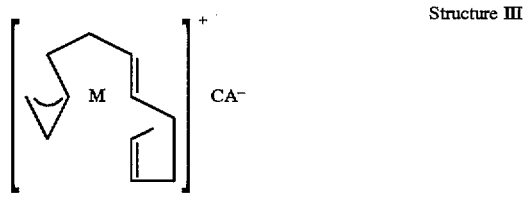

Structure III where $R^1$, $R^2$, $R^3$ are each independently a hydrogen atom, or an alkyl, aralkyl, or cycloalkyl group containing from 1 to 8 carbon atoms. Optionally, any two of $R^1$, $R^2$, $R^3$ may be linked together to form a cyclic ring structure.

Embodiment (ii) of the complex cation is illustrated by:

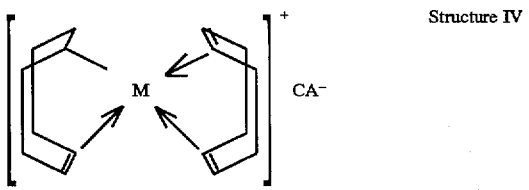

Structure IV

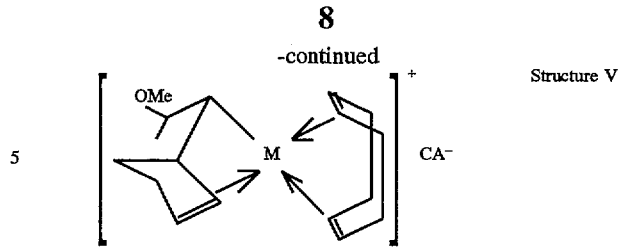

Structure V

It is a specific object of this invention to provide the above-described complex cation of "M" with a weakly coordinating or non-coordinating counteranion which is a relatively inert and poor nucleophile, which provides the cation with essential solubility in hydrocarbon and halohydrocarbon solvents such as toluene, xylene, and 1,2-dichloroethane. The anion is preferably selected from the group consisting of a tetrafluoride of Ga, Al, and B, or a hexafluoride of P, Sb and As, and a phenyl borate in which the phenyl ring has F or $CF_3$ substituents.

Such a preformed single-component complex may be formed in solution, in situ, and added to one or more monomers; or, the preformed single-component complex may be recovered from solution as a solid, then added to the monomer(s). In either form, whether as solution or as solid, the preformed single-component complex necessarily has a Group VIII metal in combination with a labile bidentate ligand.

The key to proper anion design requires that it be labile and stable toward reactions with the cationic metal complex in the final catalyst species and that it renders the single component catalyst soluble in the hydrocarbon or halohydrocarbon solvents of this invention. The anions which are stable toward reactions with water or Brønsted acids, and which do not have acidic protons located on the exterior of the anion (i.e., anionic complexes which do not react with strong acids or bases) possess the stability necessary to qualify as a stable anion for the catalyst system. The properties of the anion which are important for maximum lability include overall size, and shape (i.e., large radius of curvature), and nucleophilicity.

In general, a suitable anion may be any stable anion which allows the catalyst to be dissolved in a solvent of choice, and has the following attributes: (1) the anion should form stable salts with the aforementioned Lewis acid, Brønsted acids, reducible Lewis Acids, protonated Lewis bases, thallium and silver cations; (2) the negative charge on the anion should be delocalized over the framework of the anion or be localized within the core of the anion; (3) the anion should be a relatively poor nucleophile; and (4) the anion should not be a powerful reducing or oxidizing agent.

Examples of anions meeting the foregoing criteria are the following: $BF_4^-$; $PF_6^-$; $AlF_3O_3SCF_3^-$; $SbF_6^-$; $B[C_6H_3(CF_3)_2]_4^-$; $SbF_5SO_3F^-$; and $B[C_6F_5]_4^-$.

A preferred pre-formed, single catalytic component is formed by protonating a known tris- or tetrakisolefinnickel compound (see P. W. Jolly and G. Wilke, Vol I supra, pgs 252 and 338) and this protonated compound does not have to be separated from solution before being added to NB-functional monomer(s) to be polymerized. A convenient proton source to convert the tris- or tetrakisolefinnickel is N,N-dimethylanilinium tetrakis(bis-3,5-trifluoromethyl) phenylborate. The precursor is most preferably chosen from (i) (t,t,t-1,5,9-cyclododecatriene)nickel or bis (cyclooctadiene)nickel; and, (ii) the reaction product of one of the foregoing with butadiene, which reaction products are represented by the structure below:

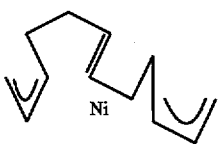

A preferred active species containing Ni is a pre-formed, single catalytic component consisting of the combination of the π-allyl-Ni-diolefin cation, for example, the π-allyl-Ni-cyclo-1,5-octadiene cation, referred to as a "[allyl-Ni-COD]⁺ complex", with a compatible weakly coordinating counteranion for the complex. There is no cocatalyst required and none is used. However, the use of an alkylaluminum compound as a cocatalyst can be advantageous in circumstances where the reagents are unusually high in protic impurities. For example, water present in the monomer can be scavenged by the alkylaluminum compound.

The catalyst may be prepared by any known synthesis which results in combining a [π-($C_6$–$C_{12}$)cycloalkadienyl]M complex containing two ligands each of which react with an acidic hydrogen atom (i.e., proton); and, a salt which will provide both solubility in a commercially easily available and environmentally acceptable solvent, as well as a compatible weakly coordinating counteranion for the complex which provides the cation.

In this combination, it is preferred to use an anion of a Group IIIA tetrafluoride, e.g., $BF_4^-$; or a Group VA hexafluoride, e.g., $PF_6^-$ anion; or a phenylborate having plural fluoro or trifluoromethyl ring substitutions; or an arylborate having plural fluoromethyl substituents. Such anions provide desired solubility and are compatible with and noncoordinating toward the Ni-complex cation formed. Yet such anions effectively stabilize the cation without adversely affecting its ability to polymerize NB-functional monomers.

The specific catalyst: allyl-Ni-COD/weakly coordinating anion is pre-formed by first forming a neutral Ni[COD]$_2$ complex, reacting the complex with an allylbromide to generate a bis(allylNi bromide) complex which is then subjected to scission with a halide abstracting agent and an anion-providing salt such as thallium hexalfluorophosphate or silver hexafluoroantimonate. The sequence is written as follows:

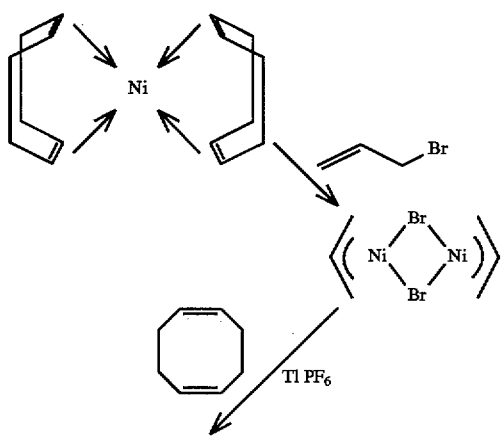

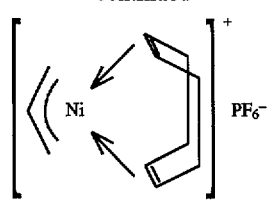

When partitioned, only one COD ligand remains, and it is bonded through two π bonds to the nickel.

Multicomponent Catalysts

The multicomponent catalyst system embodiment of the present invention comprises a Group VIII transition metal source, an organoaluminum compound, and an optional third component.

The Group VIII transition metal source is selected from a compound containing at least one transition metal selected from Group VIII of the Periodic Table. Said transition metal compound is preferably soluble or made to be soluble in the reaction medium. There are no restrictions on the transition metal compound so long as it provides a source of catalytically active Group VIII transition metal ions. Preferably, the Group VIII transition metal compound is soluble or can be made to be soluble in the reaction medium. The Group VIII transition metal preferably is selected from iron, cobalt, nickel, rhodium, ruthenium, palladium and platinum. Of these, nickel, palladium and cobalt are particularly preferred.

The Group VIII transition metal compound comprises ionic and/or neutral ligand(s) bonded to the Group VIII transition metal. The ionic and neutral ligands can be selected from a variety of monodentate, bidentate, or multidentate moieties and combinations thereof.

Representative of the ionic ligands that can be bonded to the Group VIII transition metal to form the transition metal compound are anionic ligands selected from the halides such as chloride, bromide, iodide or fluoride ions; pseudohalides such as cyanide, cyanate, thiocyanate, hydride; carbanions such as branched and unbranched ($C_1$–$C_{40}$) alkylanions, phenyl anion; cyclopentadienylide anions; π-allyl groupings; enolates of β-dicarbonyl compounds such as acetylacetonoate, 2,4-pentanedionate and halogenated acetylacetonoates such as 1,1,1,5,5,5-hexafluoro-2,4-pentanedionate, 1,1,1-trifluoro-2,4,pentanedionate; anions of acidic oxides of carbon such as carboxylates and halogenated carboxylates (e.g., acetates, 2-ethylhexanoate, neodecanoate, trifluoroacetate, etc.) and oxides of nitrogen (e.g., nitrates, nitrites, etc.) of bismuth (e.g. bismuthate, etc.), of aluminum (e.g., aluminates, etc.), of silicon (e.g., silicate, etc.), of phosphorous (e.g., phosphates, phosphites, phosphines, etc.) of sulfur (e.g., sulfates such as triflate, p-toluene sulfonate, sulfites, etc.); ylides; amides; imides; oxides; phosphides; sulfides; ($C_6$–$C_{24}$) aryloxides, ($C_1$–$C_{20}$) alkoxides, hydroxide, hydroxy ($C_1$–$C_{20}$) alkyl; catechols; oxylate; chelating alkoxides and aryloxides; complex anions such as $PF_6^-$, $AlF_3O_3SCF_6^-$, $SbF_6^-$ and compounds represented by the formulae:

$Al(R^7)_4^-$, $B(X)_4^-$ wherein $R^7$ and X independently represent a halogen atom selected from Cl, F, I, and Br, or a substituted or unsubstituted hydrocarbyl group. Representative of hydrocarbyl are ($C_1$–$C_{25}$) alkyl such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonodecyl, eicosyl, heneicosyl, docosyl, tricosyl, tetracosyl, pentacosyl, and isomeric forms thereof; ($C_2-C_{25}$) alkenyl such as vinyl, allyl, crotyl, butenyl, pentenyl, hexenyl, octenyl, nonenyl, decenyl, undecenyl, dodecenyl, tridecenyl, tetradecenyl pentadecenyl, hexadecenyl, heptadecenyl, octadecenyl, nonadecenyl, pentacosenyl, and isomeric forms thereof. ($C_6-C_{25}$) aryl such as phenyl, tolyl, xylyl, naphthyl, and the like; ($C_7-C_{25}$) aralkyl such as benzyl, phenethyl, phenpropyl, phenbutyl, phenhexyl, napthoctyl, and the like; ($C_3-C_8$) cycloalkyl such as cyclopropyl, cyclobutyl, cyclopentyl, cyclohexyl, cycloheptyl, cyclooctyl, 2-norbornyl, 2-norbonenyl, and the like. In addition to the above definitions X represents the radical:

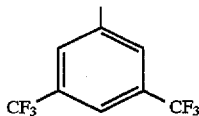

The term substituted hydrocarbyl means the hydrocarbyl group as previously defined wherein one or more hydrogen atoms have been replaced with a halogen atom such as Cl, F, Br, and I (e.g., as in the perfluorophenyl radical); hydroxyl; amino; alkyl; nitro; mercapto, and the like.

The ionic ligand also can be chosen from cations such as, for example, organoammonium, organoarsonium, organophosphonium, and pyridinium compounds represented by the formulae:

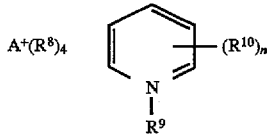

wherein A represents nitrogen, arsenic, and phosphorous and the $R^8$ radicals can be independently selected from hydrogen, branched or unbranched ($C_1-C_{20}$) alkyl, branched or unbranched ($C_2-C_{20}$) alkenyl, and ($C_5-C_{16}$) cycloalkyl, e.g., cyclopentyl, cyclohexyl, cycloheptyl, cyclooctyl, and the like. $R^9$ and $R^{10}$ are independently selected from hydrogen, branched and unbranched ($C_1-C_{50}$) alkyl, branched and unbranched ($C_2-C_{50}$) alkenyl and ($C_5-C_{16}$) cycloalkyl groups as defined above; and n is 1 to 5, preferably n is 3, most preferably n=1. The $R^{10}$ radicals preferably are attached to positions 3, 4, and 5 on the pyridine ring.

It should be noted that increasing the sum of the carbon atoms contained in the $R^8$ radicals confers better solubility of the transition metal compound in organic media such as organic solvents and NB-functional monomer. Preferably, the $R^8$ radicals are selected from ($C_1-C_{18}$) alkyl groups wherein the sum of carbon atoms for all $R^8$ radicals is 15 to 72, preferably 25 to 48, more preferably 21 to 42. The $R^9$ radical is preferably selected from branched and unbranched ($C_1-C_{50}$) alkyl, more preferably ($C_{10}-C_{40}$) alkyl. $R^{10}$ is preferably selected from branched and unbranched ($C_1C_{40}$) alkyl, more preferably ($C_2-C_{30}$) alkyl.

Specific examples of organoammonium cations include tridodecylammonium, methyltricaprylammonium, tris(tridecyl)ammonium and trioctylammonium. Specific examples of organoarsonium and organophosphonium cations include tridodecylarsonium and phosphonium, methyl-tricaprylarsonium and phosphonium, tris(tridecyl)arsonium and phosphonium, and trioctylarsonium and phosphonium. Specific pyridinium cations include eicosyl-4-(1-butylpentyl)pyridinium, docosyl-4-(13-pentacosyl)pyridinium, and eicosyl-4-(1-butylpentyl)pyridinium.

Suitable neutral ligands which can be bonded to the Group VIII transition metal are the olefins; the acetylenes; carbon monoxide; nitric oxide, nitrogen compounds such as ammonia, isocyanide, isocyanate, isothiocyanate; pyridines and pyridine derivatives (e.g., 1,10-phenanthroline, 2,2'-dipyridyl), 1,4-dialkyl-1,3-diazabutadiene, amines such as represented by the formulae:

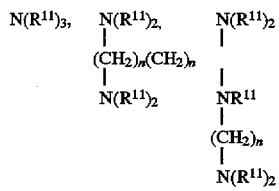

wherein $R^{11}$ is independently hydrocarbyl or substituted hydrocarbyl as previously defined and n is 2 to 10. Ureas; nitriles such as acetonitrile, benzonitrile and halogenated derivatives thereof; organic ethers such as dimethyl ether of diethylene glycol, dioxane, tetrahydrofuran, furan diallyl ether, diethyl ether, cyclic ethers such as diethylene glycol cyclic oligomers; organic sulfides such as diethyl sulfide; thioethers; arsines; stibines; phosphines such as triarylphosphines (e.g., triphenylphosphine), trialkylphosphines (e.g., trimethyl, triethyl, tripropyl, tripentacosyl, and halogenated derivatives thereof), bis(diphenylphosphino)ethane, bis(diphenylphosphino)propane, bis(dimethylphosphino)propane, bis(diphenylphosphino)butane, (S)-(–)2,2'-bis(diphenylphosphino)-1,1'-binaphthyl, (R)-(+)-2,2'-bis(diphenylphosphino)-1,1'-binaphthyl, and bis(2-diphenylphosphinoethyl)phenylphosphine; phosphine oxides, phosphorus halides; phosphites represented by the formula:

$P(OR^{11})_3$ wherein $R^{11}$ independently represents a hydrocarbyl or substituted hydrocarbyl as previously defined; phosphorus oxyhalides; phosphonates; phosphonites, phosphinites, ketones; sulfoxides such as ($C_1-C_{20}$) alkylsulfoxides; ($C_6-C_{20}$) arylsulfoxides, ($C_7-C_{40}$) alkarylsulfoxides, and the like. It should be recognized that the foregoing neutral ligands can be utilized as optional third components as will be described hereinbelow.

More specifically, the Group VIII transition metal source of the present invention can be represented by the following formula:

$C^{c'}_c[M^{m'}_m X^{x'}_x Y^{y'}_y L_l]$ wherein C represents a cation as previously described;

M represents a Group VIII transition metal selected from the group of iron, cobalt, nickel, ruthenium, palladium, and platinum. Preferably M is nickel, cobalt or palladium;

X and Y independently represent anionic ligands as previously described;

L represents neutral ligands as previously described;

x, y, and l are 0 to 15 with the proviso that x, y, and l cannot all be zero at the same time;

c is 0, 1, 2, or 3;

c' is the charge of C m is 1 to 4 m' is the oxidation state of the Group VIII transition metal M which is determined by the equation $$m' = \frac{(xx' + yy') - cc'}{m};$$

x' is the absolute value of the charge of X;
y' is the absolute value of the charge of Y;
Examples of Group VIII transition metal compounds suitable as the transition metal ion source include:
nickel acetylacetonates
nickel carboxylates
nickel dimethylglyoxime
nickel ethylhexanoate
cobalt neodecanoate
iron napthenate
palladium ethylhexanoate
$NiCl_2(PPh_3)_2$
$NiCl_2(PPh_2CH_2)_2$
nickel (II) hexafluoroacetylacetonate tetrahydrate
nickel (II) trifluoroacetylacetonate dihydrate
nickel (II) acetylacetonate tetrahydrate
trans-Pd $Cl_2(PPh_3)_2$
palladium (II) bis(trifluoroacetate)
palladium (II) bis(acetylacetonate)
palladium (II) 2-ethylhexanoate
$Pd(acetate)_2(PPh_3)_2$
palladium (II) bromide
palladium (II) chloride
palladium (II) iodide
palladium (II) oxide
monoacetonitriyletris(triphenylphosphine) palladium (II) tetrafluoroborate
tetrakis(acetonitrile) palladium (II) tetrafluoroborate
dichlorobis(acetonitrile) palladium (II)
dichlorobis(triphenylphosphine) palladium (II)
dichlorobis(benzonitrile) palladium (II)
iron (II) chloride
iron (III) chloride
iron (II) bromide
iron (III) bromide
iron (II) acetate
iron (III) acetylacetonate
ferrocene
nickelocene
nickel (II) acetate
nickel bromide
nickel chloride
dichlorohexyl nickel acetate
nickel lactate
nickel oxide
nickel tetrafluoroborate
cobalt (II) acetate
cobalt (II) acetylacetonate
cobalt (III) acetylacetonate
cobalt (II) benzoate
cobalt chloride
cobalt bromide
dichlorohexyl cobalt acetates
cobalt (II) stearate
cobalt (II) tetrafluoroborate
bis(allyl)nickel
bis(cyclopentadienyl)nickel
palladium acetylacetonate
palladium bis(acetonitrile) dichloride
palladium bis(dimethylsulfoxide) dichloride
platinum bis(triethylphosphine) hydrobromide
ruthenium tris(triphnylphosphine) dichloride
ruthenium tris(triphenylphosphine) hydrido chloride
ruthenium trichloride
ruthenium tetrakis(acetonitrile) dichloride
ruthenium tetrakis(dimethylsulfoxide) dichloride
rhodium chloride
rhodium tris(triphenylphosphine) trichloride The organoaluminum component of the catalyst system of the present invention is represented by the formula:

$AlR^{12}_{3-x}Q_x$ wherein $R^{12}$ independently represents branched and unbranched ($C_1$–$C_{20}$) alkyl, ($C_6$–$C_{24}$) aryl, ($C_7$–$C_{20}$) aralkyl, ($C_3$–$C_{10}$) cycloalkyl; Q is a halide or pseudohalide selected from chlorine, fluorine, bromine, iodine, branched and unbranched ($C_1$–$C_{20}$) alkoxy, ($C_6$–$C_{24}$) aryloxy; and x is 0 to 2.5, preferably 0 to 2.

Representative organoaluminums compounds include trialkylaluminums such as trimethylaluminum, triethylaluminum, tripropylaluminum, triisopropylaluminum, triisobutylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, trioctylaluminum, tris-2-norbonylaluminum, and the like.

Dialkylaluminum halides such as dimethylaluminum chloride, diethylaluminum chloride, diisopropylaluminum chloride, diisobutylaluminum chloride, and the like.

Monoalkylaluminum dihalides such as methylaluminum dichloride, ethylaluminum dichloride, ethylaluminum diiodide, propylaluminum dichloride, isopropylaluminum dichloride, butylaluminum dichloride, isobutylaluminum dichloride, and the like.

Alkylaluminum sesquihalides such as methylaluminum sesquichloride, ethylaluminum sesquichloride, propylaluminum sesquichloride, isobutylaluminum sesquichloride, and the like.

With regard to the preparation of most copolymers, the organoaluminum component also includes methaluminoxane. However, methaluminoxane is specifically excluded from the use as an organoaluminum component in the method directed to the preparation of a copolymer from 0.1 to 99.9 weight percent of an aromatic olefin.

In the practice of the present invention, the catalytic system obtained from the Group VIII transition metal source and the organoaluminum component can be effectively used, however, if desired, the catalyst system employed can optionally contain a third component or third components.

Examples of such third components are Lewis acids such as the $BF_3$.etherate, $TiCl_4$, $SbF_5$, tris(perfluorophenyl)boron, $BCl_3$, $B(OCH_2CH_3)_3$, $SiCl_4$; strong Brønsted acids such as hexafluoroantimonic acid ($HSbF_6$), $HPF_6$ hydrate, trifluoroacetic acid ($CF_3CO_2H$), and $FSO_3H.SbF_5$, $H_2C(SO_2CF_3)_2$, $CF_3SO_3H$, and paratoluenesulfonic acid; halogenated compounds such as hexachloroacetone, hexafluoroacetone, 3-butenoic acid-2,2,3,4,4-pentachlorobutylester, hexafluoroglutaric acid, hexafluoroisopropanol, and chloranil, i.e.,

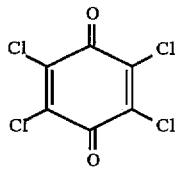

electron donors such as phosphines and phosphites and olefinic electron donors selected from ($C_4$–$C_{12}$) aliphatic and ($C_6$–$C_{12}$) cycloaliphatic diolefins, such as butadiene, cyclooctadiene, and norbornadiene.

Acidity of strong Brønsted acids can be gauged by determining their Hammet acidity function $H_0$. A definition of the Hammet acidity function is found in *Advanced Inorganic Chemistry* by F. A. Cotton and G. Wilkinson, Wiley-Interscience, 1988, p. 107.

As set above the neutral ligands can be employed as optional third components as electron donating compounds.

In one embodiment the multicomponent catalyst system can be prepared by a process which comprises mixing the catalyst components, i.e., the Group VIII transition metal compound, the organoaluminum compound, and third component (if employed), together in a hydrocarbon or halohydrocarbon solvent and then mixing the premixed catalyst system in the reaction medium comprising at least one norbornene-functional monomer. Alternatively, (assuming the optional third component is utilized), any two of the catalyst system components can be premixed in a hydrocarbon or halohydrocarbon solvent and then introduced into the reaction medium. The remaining catalyst component can be added to the reaction medium before or after the addition of the premixed components.

In another embodiment, the catalyst system can be prepared in situ by mixing together all of the catalyst components in the reaction medium. The order of addition is not important.

The polymerizations of the present invention are carried out in an organic solvent which does not adversely interfere with the catalyst system and is a solvent for the monomer. Examples of organic solvents are aliphatic (non-polar) hydrocarbons such as pentane, hexane, heptane, octane and decane; alicyclic hydrocarbons such as cyclopentane and cyclohexane; aromatic hydrocarbons such as benzene, toluene, and xylene; halogenated (polar) hydrocarbons such as methylene chloride, ethyl chloride, 1,1-dichloroethane, 1,2-dichloroethane, 1,2-dichloroethylene, 1-chloropropane, 2-chloropropane, 1-chlorobutane, 2-chlorobutane, 1-chloro-2-methylpropane, 1-chloropentane, chlorobenzene, o-dichlorobenzene, m-dichlorobenzene, and p-dichlorobenzene.

The choice of reaction solvent is made on the basis of a number of factors including the choice of catalyst and whether it is desired to run the polymerization as a slurry or solution process. To conduct a polymerization in solution it necessary to use a solvent, or a combination of solvents, in which are soluble both the monomer(s) and the resulting polymer and preferably the catalyst (in a homogeneous system). Most polymers are soluble in chlorinated aromatic solvents, such as chlorobenzene for example. To conduct a polymerization in a slurry the polymers are not soluble in a diluent. Usually such polymerizations may be carried out in chlorinated aliphatic diluents. Solubility of a polymer will generally depend on the composition (on the monomers employed), the molecular weight and the tacticity of the polymer and the latter two will depend to a large extent on the catalyst used. For example, if a Ni catalyst is used to make an NB/ethyl vinyl ether copolymer, the product is only soluble in hot chlorinated aromatic solvents, such as chlorinated benzene. However, ethyl vinyl ether homopolymer is soluble in cyclohexane or chlorinated benzene at ambient temperature. A copolymer of at least 80 mole % NB/isobutylene, if a Ni catalyst is used, is highly soluble in cyclohexane, but a Pd catalyst is used, it is only sparingly soluble in chlorinated benzene even at elevated temperatures.

The molar ratio of total monomer to Group VIII transition metal for the single and multicomponent catalysts can run from 1,000:1 to 100,000:1, preferably 1,000:1 to 20,000:1, and most preferably 3,000:1 to 10,000:1. When methalumi-noxane is used as a cocatalyst, the aluminum metal to Group VIII transition metal molar ratio ranges from greater than or equal to 50:1, preferably equal or greater than 100:1.

In the multicomponent catalyst systems, aluminum metal to Group VIII transition metal molar ratio ranges from less than or equal to 100:1, preferably less than or equal to 30:1, and most preferably less than or equal to 20:1.

The optional third component is employed in a molar ratio to Group VIII transition metal ranging from 0.25:1 to 20:1. When Bronsted acids are employed as third components, the acid to Group VIII transition metal range is less than or equal to 4:1, preferably less than or equal to 2:1.

The temperature at which the polymerization reactions of the present invention are carried out typically ranges from −100° C. to 120° C., preferably −40° C. to 90° C.

The optimum temperature for the present invention is dependent on a number of variables, primarily the choice of monomers, choice of catalyst and the choice of reaction diluent. Thus, for any given polymerization the optimum temperature will be experimentally determined taking these variables into account.

To control the explosive speed of the polymerization reactions carried out with the single or multicomponent catalyst systems of this invention, a suitable monomer to catalyst molar ratio is selected, the reactor can be cooled to slow down the reaction, and the reaction can be carried out in a high boiling solvent. By high boiling solvent is meant that the solvent has a boiling point above the polymerization temperature. If a pressure reaction vessel is employed to contain the polymerization reaction, the foregoing considerations do not have to be taken into account.

In one embodiment of the multicomponent catalyst system of the present invention, a typical catalyst system comprises a Group VIII transition metal salt, e.g., nickel ethylhexanoate, an organoaluminum compound, e.g., triethylaluminum, and a mixture of optional third components, e.g., $BF_3$.etherate and hexafluoroantimonic acid ($HSbF_6$), in a preferred molar ratio of Al/$BF_3$.etherate/Ni/acid of 10/9/1/0.5-2. The reaction sequence is written as follows:

Nickel ethylhexanoate+$HSbF_6$+9$BF_3$.etherate+10 triethylaluminum→active catalyst.

In another embodiment of the multicomponent catalyst system of the invention the optional third component is a halogenated compound selected from various halogenated activators. A typical catalyst system comprises a Group VIII transition metal salt, an organoaluminum, and the third component halogenated compound shown in the reaction sequence written below:

Nickel carboxylate+triethylaluminum+chloranil→active catalyst.

In still another embodiment of the multicomponent catalyst system of this invention no third component is present.

The catalyst system comprises a Group VIII metal salt and a monoalkylaluminum dihalide component run in a hydrocarbon or halohydrocarbon solvent as shown in the reaction sequence below:

Nickel ethylhexanoate+ethylaluminum dichloride+ hydrocarbon solvent (heptane, cyclohexane)→active catalyst.

As noted earlier, the present invention relates to the novel method of the preparation of various polymers and to certain novel copolymers. One feature of the invention involves copolymers of one or more NB-type monomers and of one or more carbocationically polymerizable olefinic monomers.

NB-Type Monomers

By norbornene-type or NB-type monomers is meant monomers that are characterized by containing at least one norbornene-moiety in their structures, including norbornadiene as identified by the formulae below which can be substituted or unsubstituted:

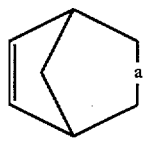

VI wherein "a" represents a single or double bond.

Representative monomers are identified by formulae VII and VIII as follows:

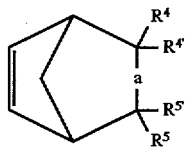

VII

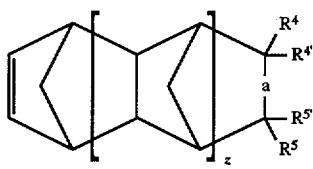

VIII wherein $R^4$, $R^{4'}$ $R^5$, and $R^{5'}$ independently represent hydrogen, halogen, branched and unbranched ($C_{1-C20}$) alkyl, branched and unbranched ($C_1-C_{20}$) haloalkyl, substituted and unsubstituted ($C_5-C_{12}$) cycloalkyl, ($C_1-C_6$) alkylidenyl, ($C_6-C_{40}$) aryl, ($C_6-C_{40}$) haloaryl, ($C_7-C_{15}$) aralkyl, ($C_7-C_{15}$) haloaralkyl, ($C_3-C_{20}$) alkynyl, branched and unbranched ($C_3-C_{20}$) alkenyl, provided the alkenyl radical does not contain a terminal double bond, that is the double bond in the radical is an internal olefinic bond, or vinyl; $R^4$ and $R^5$ when taken with the two ring carbon atoms to which they are attached can represent saturated and unsaturated cyclic groups containing 4 to 12 carbon atoms or an aromatic ring containing 6 to 17 carbon atoms; "a" represents a single or double bond, and z is 1 to 5. It should be B noted that when $R^4$, $R_{4'}$ $R^5$, and $R^{5'}$ represent an alkylidene radical the carbon atom to which the alkylidene radical is connected does not have another substituent, and when "a" is a double bond $R^4$, $R^{4'}$ $R^5$, and $R^{5'}$ cannot be alkylidenyl.

Examples of norbornene-type monomers include norbornadiene, 2-norbornene, 5-methyl-2-norbornene, 5-hexyl-2-norbornene, 5-ethylidenyl-2-norbornene, vinylnorbornene, dicyclopentadiene, dihydrodicyclopentadiene, tetracyclododecene, methyltetracyclododecene, tetracyclododecadiene, dimethyltetracyclododecene, ethyltetracyclododecene, ethylidenyl tetracyclododecene, phenyltetracyclodecene, trimers of cyclopentadiene (e.g., symmetrical and asymmetrical trimers) and halogenated norbornadiene and norbornene-type monomers wherein $R^4$, $R^{4'}$ $R^5$, and $R^{5'}$ independently represent hydrogen, halogen (e.g., Cl, F, I, Br) and fully halogenated alkyl groups of the formula $C_nF_{2n+1}$ wherein n represents the number of carbon atom from 1 to 20. Representative substituents are trifluoromethyl, —$C_4F_9$, —$C_{10}F_{21}$, and —$C_{20}F_{41}$.

The halogenated norbornene-type monomers can be synthesized via the Diels-Alder reaction of cyclopentadiene with the appropriate halogenated dieneophile as shown in the following reaction schemes:

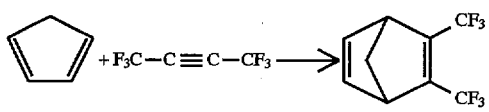

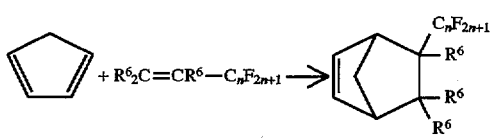

wherein $R^6$ independently represents hydrogen or F and n is 1 to 20.

Another class of NB-type monomers which may be used in the present invention is the functional NB-type monomers represented by the following structural formula:

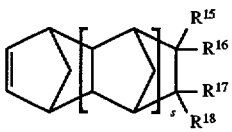

wherein s is 0 to 5, $R^{15}$ to $R^{18}$ independently represent hydrogen; hydrocarbyl selected from the group of linear and branched ($C_1-C_{24}$) alkyl, ($C_6-C_{12}$) aryl or aryl substituted with hydroxyl and alkyl having 1 to 4 carbon atoms, especially branched alkyl (such as tert-butyl) on a phenol group, or functional substituent selected from the group —$(CH_2)_p$—OH, —$(CH_2)_p$—C(O)—OH, —$(CH_2)_p$—C(O)OR', —$(CH_2)_p$—OR$^{20}$, —$(CH_2)_p$—OC(O)R$^{20}$, —$(CH_2)_p$—OC(O)OR$^{20}$, —$(CH_2)_p$—C(O)R$^{20}$, —$(CH_2)_p$—O—$(CH_2)_p$OH, —$(CH_2)_p$OR$^{20}$, wherein p independently is 0 to 24 or 0 to 10 and R$^{20}$ represents linear or branched ($C_1-C_{10}$) alkyl or the group

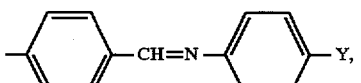

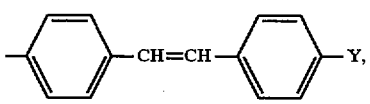

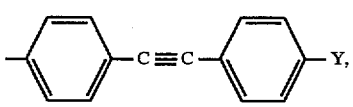

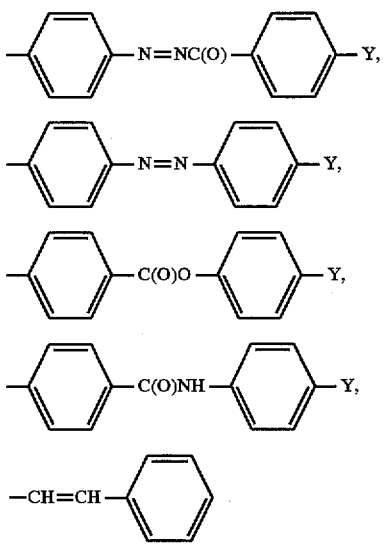

wherein Y is hydrogen, $C_rH_{2r+1}$, $C_rH_{2r+1}O$, $C_rH_{2r+1}OC(O)$, or —CN, wherein r is an integer from 1 to 12; any of $R^{15}$ and $R^{16}$ or $R^{17}$ and $R^{18}$ can be taken together to form ($C_1$-$C_{10}$) alkylidene group (e.g., $=CH_2$, $=CH—CH_3$, etc.) $R^{15}$ and $R^{18}$ can be taken together with the ring carbon atoms to which they are attached to form an anhydride or dicarboxyimide group as shown in the structures below:

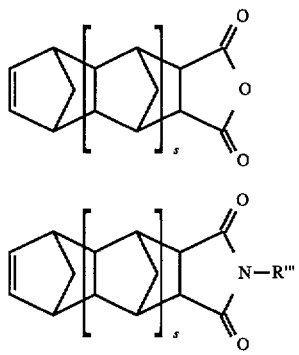

wherein n is as previously defined and R''' is linear and branched ($C_1$-$C_{20}$) alkyl, ($C_6$-$C_{12}$) aryl, ($C_7$-$C_{15}$) aralkyl representative substituents include methyl, ethyl, n-propyl, i-propyl, n-butyl, t-butyl, pentyl, hexyl decyl, phenyl, and benzyl. At least one of $R^1$ to $R^4$ must be a functional substituent.

In the above formula, s is preferably 0 or 1 as represented by the structures below:

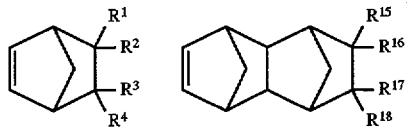

wherein $R^1$ and $R^4$ are as defined above. Preferred substituents include hydroxy, hydroxyalkyl, alkoxy, alkoxyalkyl, carboxy, carboxyalkyl, alkoxycarbonyl, alkycarbonyloxy, alkoxycarbonyloxy, alkylcarbonyl, and a methylene (—$CH_2$—) or linear polymethylene (—$CH_2$—)$_m$ moiety terminated with an alkoxycarbonyl-, alkylcarbonyloxy-, alkoxycarbonyloxy-, alkylcarbonyl-, and hydroxyalkyloxy-group. Representative monomers include 5-hydroxy-2-norbornene, 5-hydroxymethyl-2-norbornene, 5-methoxy-2-norbornene, 5-t-butoxycarbonyl-2-norbornene, 5-methoxy-5-carboxy-2-norbornene, 5-carboxymethyl-2-norbornene, decanoic acid of 5-norbornene-2-methanol, 5-methoxycarbonyl-2-norbornene, octanoic acid ester of 5-norbornene-2-methanol, phenylcinnaminic acid ester of 5-norbornene-2-methanol, N-phenylnorbornenedicarboximide, and 5-norbornene-2,3-dicarboxylic anhydride.

Cationically Polymerizable Monomers

Monomers which may be copolymerized with NB-type monomers or which may be homopolymerized or copolymerized with each other, forming non-NB containing polymers, using the coordination cationic polymerization catalysts, are those monomers which have been tabulated as being polymerizable via carbocationic methods in "Carbocationic Polymerization" by Joseph P. Kennedy and Ernest Marechal, Wiley Interscience, New York 1982. These olefinic monomers include isoolefins, branched α-olefins, conjugated olefins and bicyclic olefins.

The isoolefins may be represented by $CH_2=CRR'$ where R and R' are independently selected from alkyl radicals having up to 12 or more carbon atoms, such as methyl, ethyl, n-propyl, i-propyl, t-butyl etc. Examples include isobutylene, 2-methyl-1-butene, 2-methyl-1-pentene, 2-ethyl-1-butene, 2,3-dimethyl-1-butene, 2,3,3-trimethyl-1-butene, 2,5-dimethyl-1,5-hexadiene and the like.

The branched α-olefins may be represented by $CH_2=CHR$ where R is a branched alkyl radical (including cyclic alkyl) having up to 12 or more carbon atoms. Examples include 3-methyl-1-pentene, 4-methyl-1-hexene, 6-methyl-1-heptene, allylcyclohexane and the like.

The conjugated olefins consist of conjugated diene and triene olefins which include straight chain and cyclic dienes and trienes having up to 12 carbon atoms, such as butadiene, isoprene, piperylene, 1,4-dimethylbutadiene, trans-2-methyl-1,3-pentadiene, 1,2-dimethylenecyclohexane, cyclopentadiene and the like.

The bicyclic olefins include compounds such as β-pinene.

In addition to the above described olefin monomers we have also found that coordination cationic catalysts are highly effective in the homo- and co-polymerization of the vinyl ether monomer family. This class of monomers is disclosed by Toshinobu Higashimura and Mitsuo Sawamoto Chapter 42, "Carbocationic Polymerization: Vinyl Ethers" in "Comprehensive Polymer Science", Volume 3, Pergamon Press, Oxford 1989. Vinyl ethers polymerizable using the catalysts of the present invention include alkyl vinyl ethers, aryl vinyl ethers, functionally substituted vinyl ethers, divinyl ethers, α-substituted and β-substituted vinyl ethers.

The alkyl vinyl ethers represented by $CH_2=CHOR$ where R is a linear, branched or cyclic alkyl group or an aralkyl group of up to 12 carbons or more. Examples include methylvinylether, ethylvinylether, n-propylvinylether, n-butylvinylether, iso-propylvinylether, iso-butylvinylether, t-butylvinylether, cyclohexylvinylether, benzylvinylether and the like.

The aryl vinyl ethers represented by $CH_2=CHOR'$ where R' is a phenyl group, substituted phenyl group or a naphthyl group or substituted naphthyl group (where the substituents are lower alkyl, halogen. Examples include phenylvinylether, para-tolylvinylether, naphthylvinylether and the like.

The functionally substituted vinyl ethers represented by $CH_2=CHOX$ where X is an alkyl or aryl group having up to 20 carbon atoms attached to a heteroatom (halogen, silicon etc.) or bearing an ether, ester or amine derivative group.

Examples include para-anisylvinylether, 2-chloroethylvinylether, $CH_2=CHOCH_2CH_2O_2CCH_3$,
$CH_2=CHOCH_2CH_2O_2CC_6H_5$,
$CH_2=CHOCH_2CH_2O_2CC(CH_3)=CH$,
$CH_2=CHOCH_2CH_2O_2CCH=CH_2$,
$CH_2=CHOCH_2CH_2O_2CCH=CHC_6H_5$,
$CH_2=CHOCH_2CH_2O_2CCH=CHCH=CHCH_3$,
$CH_2=CHOCH_2CH_2O(CH_2CH_2O)_nC_2H_5$,
$CH_2=CHOCH_2CH_2OC_6H_5$,
$CH_2=CHOCH_2CH_2CH(CO_2C_2H_5)_2$,
$CH_2=CHOCH_2CH_2C(CO_2C_2H_5)_3$,
$CH_2=CHOCH_2CH_2OC_6H_4\text{-p-}C_6H_4\text{-p-}OCH_3$,
$CH_2=CHOCH_2CH_2O(CH_2CH_2O)_nC_6H_4\text{-p-}C_6H_4\text{-p-}OCH_3$
and the like.

The divinylethers ($CH_2=CHOCH=CH_2$ and $CH_2=CHOXOCH=CH_2$) where X is $-(CH_2)_n-$, $-(CH_2CH_2O)_nCH_2CH_2-$, $-CH_2CH_2OC(CH_3)_2C_6H_4C(CH_3)_2OCH_2CH_2-$ etc. where n is 1 to 12.

The α-substituted vinyl ethers ($CH_2=CR'OR$) where R is a linear, branched or cyclic alkyl group up to 12 carbon atoms and R' is a methyl or alkoxy group up to 12 carbon atoms, or chlorine, such as α-methyl ethylvinylether.

The β-substituted vinyl ethers represented by (R'CH=CHOR) where R is a linear, branched or cyclic alkyl group having up to 12 carbons and R' is a methyl or alkoxy group of up to 12 carbons or chlorine, such as β-methyl ethylvinyl ether. Additionally, the catalysts of the present invention are excellent catalysts for the homo- and co-polymerization of N-vinylcarbazole.

Furthermore, coordination cationic catalysts of the present invention are capable of catalyzing the cationic ring-opening polymerization of certain cyclic ethers. The cyclic ethers which are polymerizable using these catalysts are oxiranes and oxetanes.

The oxiranes or epoxides contain up to 12 carbons which may be halogenated. Examples are ethylene oxide, propylene oxide, cyclohexene oxide, vinylcyclohexene oxide, norbornene oxide, epichlorohydrin, and the like.

The oxetanes contain up to 12 carbons which may be halogenated Examples are oxetane, 3,3-dimethyloxetane and 3,3-bis(chloromethyl)oxetane, and the like.

We have also discovered that the catalysts of the present invention are capable of catalyzing the cationic ring-opening polymerization of certain cyclic esters. The cyclic esters that are polymerizable using the catalysts of the present invention are lactones. Illustrative examples of such monomers are β-propiolactone, ε-caprolactone, δ-valerolactone and lactones substituted with alkyl groups containing 1–12 carbon atoms such as α,α-dimethyl-β-propiolactone, β-methyl-β-propiolactone and β, β'-dimethyl-β-propiolactone.

For the purpose of the present invention, aromatic olefins are NOT considered to be cationically polymerizable monomers. However, aromatic olefins may also be used in preparing certain copolymers, especially terpolymers with NB-type monomers and with cationically polymerizable monomers. Such aromatic olefins include styrene, para-methoxystyrene (vinylanisole), α-methylstyrene, para-methylstyrene, para-isopropylstyrene, ortho-methylstyrene, 2,4-dimethylstyrene, para-dimethylaminostyrene, para-diisopropenylbenzene, ortho-divinylbenzene, indene, 1-methylindene, acenaphthalene, 2-vinylfluorene and the like.

The polymers of this invention are generally obtained in molecular weights (Mw) of from about 10,000 to over 1,000,000. The Mw of the resulting polymer will depend on the choice of the catalyst, the solvent and the polymerization temperature. Hydrocarbon (non-polar) diluents, e.g., cyclohexane, n-heptane or isooctane, will generally give higher Mw polymers while polar diluents, such as methylene chloride, dichloroethane or chlorobenzene, will yield relatively lower Mw polymers. Polymerizations carried out at higher temperatures, generally over 40° C., will yield lower Mw polymers, but they may have to be carried out under pressure. Polymerizations carried out at lower temperatures, generally below 10° C., will yield higher Mw polymers. Furthermore, higher monomer concentrations, e.g., over 5 volume percent monomer, will yield higher Mw polymers and, in a multicomponent catalyst system, the use of Lewis acids such as $BF_3$.etherate or $B(C_6F_5)_3$ result in higher molecular weights. Lower Mw polymers are generally obtained when the ratio of aluminum to transition metal is increased, when CT is employed (which functions most efficiently with Ni catalysts). Polymers of Mw between 50,000 and 500,000 are generally preferred because such polymers possess a reasonably good balance of physical properties and processability. However, for certain applications, e.g., as fuel or lubricant additives or macromonomers, low Mw polymers of between 10,000 (or even lower) and 50,000 are preferred.

Optionally, if it is desired to obtain the polymers of the present invention in very low molecular weights such as between about 2,000 and 10,000, this can be accomplished by using a suitable chain transfer agent (CTA). Suitable chain transfer agents include aluminum alkyls such as triethylaluminum or ethylaluminum dichloride, which are typically used at higher concentrations, such as from about 0.002 to about 0.01 moles of an aluminum alkyl per mole of monomer, than generally used for catalyst activation. Such higher concentrations of aluminum alkyls substantially reduce molecular weights of the resulting polymers. Excellent results are obtained using α-olefins such as ethylene, propylene, 1-hexene, 1-decene, and the like, as chain transfer agents. Alternatively, a variety of olefins bearing functional groups can also be employed as CTA compounds. The classes of olefins useful as chain transfer agents or molecular weight modifiers are further discussed in the disclosure below.

The copolymers of this invention may be thermoformed, extruded, injection molded, vacuum formed, compression molded, blow molded, press molded, east from solution, solvent processed, fiber formed, and sintered, into various shapes and forms. End-use applications include automotive and transportation applications such as lighting, glazing, under hood components, body panels, bumpers, dash boards, and the like; medical applications such as fluid handling equipment, and the like; electrical and electronic applications such as computer housings, insulators, and the like; building and construction applications such as glazing, coatings, and the like; appliance panels and trim; consumer products such as housewares; microwave equipment; packaging; industrial parts and components; and optical components. Sheets, tubes and other forms of arbitrary length and cross-section may also be formed by extruding the polymer. Because of the controllable mol wt of the polymer, such forms may be adapted for use as membrane means for the separation of gas from liquid, as in pervaporation membranes; or, in the separation of liquids having different molecular weights as in nanofiltration or reverse osmosis membranes. The lower $M_w$ polymers (oligomers or macromonomers) of this invention can be used in waxes, additives, coatings, adhesives, sealants, and the like.

More specifically, copolymers of NB-type monomers and olefins or isoolefins are useful in optical applications such as lighting, signage, instrument panels, information storage and glazing. Copolymers of said monomers and additionally an aromatic olefin are useful in automatic lenses and mirrors since they also have optical properties. Branched α-olefins/NB-type copolymers as well as bicyclic olefin/NB-type copolymers are useful for applications requiring B high heat such as for heat lamp lenses and cookware. Copolymers of conjugated olefins and NB-type monomers as well as of butadiene, isoprene and NB-type monomers can be used as impact modifiers for halogenated olefins for high thermal use and for high temperature uses as synthetic elastomers for automotive seals and gaskets. Such copolymers of low molecular weights may be used as lubricant additives. Copolymers of NB-type monomers, isoprene and a small amount of an alkylidenylnorbornene such as ethylidenenorbornene are elastomers of the type of butyl rubber. Copolymers of NB-type monomers and such aromatic olefins as α-methylstyrene, para-methoxystyrene and para-N,N-dimethylaminostyrene have good hardness and therefore can be used as coatings or for making molded parts. Vinyl ether/NB-type copolymers may be used as adhesives, coatings and decorative plastic parts while polymers from said monomers and additionally an aromatic olefin as useful coatings which must have hard glass surfaces. Epoxy or oxetane/NB-type copolymers (including oxetane derivatives such as chlorinated polyethers) are good corrosion resistant materials for pipes, valves and linings. Such materials have low water absorption and good dimensional stability which makes them useful as encapsulants, coatings and in pressure vessels. Copolymers of lactones and NB-type monomers are useful as coatings, in packaging and in hoses which require higher temperature service than urethanes can provide. Polymers from said monomers plus additionally an aromatic olefin can be used as hard coatings for high gloss surfaces. Copolymers of NB-type monomers and aromatic olefins selected from α-methylstyrene, para-methoxystyrene and para-N,N-dimethylaminostyrene have improved hardness for coatings and are able to adhesively bond and/or decorate.

In the various methods of this invention a chain transfer agent (CTA) may be employed to control the molecular weight of the polymer. The chain transfer agent or CTA is represented by the following formula:

$CH_2=CHR'$ wherein R' represents hydrogen, tinbranched ($C_1$ to $C_{40}$) alkyl, unbranched ($C_2$ to $C_{40}$) alkenyl, unsubstituted ($C_7$–$C_{40}$) aralkyl or substitute with alkyl or alkoxy groups of 1 to 5 carbons, halogens and other common aryl substituents, halogen, or the group

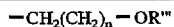
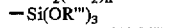
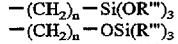
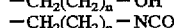
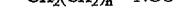

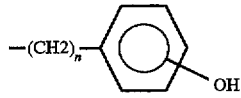

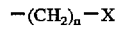

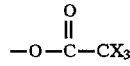

-continued

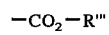

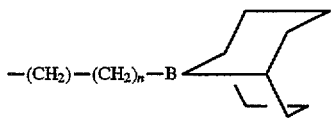

wherein R'" is branched or unbranched ($C_1$ to $C_{10}$) alkyl, preferably methyl or ethyl, branched or unbranched ($C_3$–$C_{90}$) alkenyl, substituted or unsubstituted ($C_6$–$C_{15}$) aryl wherein said substituents if present are selected from branched or unbranched ($C_1$–$C_{10}$) alkyl or haloalkyl, and halogen, X is chlorine, fluorine, bromine or iodine, and n is 0 to 20, preferably 1 to 5.

Of the above chain transfer agents the α-olefins having 2 to 10 carbon atoms are preferred, e.g., ethylene, propylene, 1-decene, 1,7-octadiene, or 1,6-octadiene.

The choice of the optimum olefinic chain transfer agent is dependent on a number of factors such as the choice of catalyst type, the process conditions (temperature, solvent, etc.), the presence or absence of alkylaluminum cocatalyst and the nature of the olefinic end group desired in the resulting polymer, oligomer or macromomer. The level of the olefinic chain transfer agent required for a given molecular weight is dependent on all of the above variables as well as the type of olefinic chain transfer agent selected.

While the optimum conditions for any given result should be experimentally determined by a skilled artisan taking into the account all of the above factors there are a number of general guidelines which can be conveniently utilized where appropriate. One observation that we have made is that the efficacy of any given chain transfer agent is highly dependent on the selection of Group VIII transition metal used in the catalyst. Notably nickel catalysts are more sensitive than other metals (i.e., a given level of olefin causes a bigger decrease in molecular weight when applied to a nickel catalyst than when applied to, for example, a palladium catalyst). Furthermore, we have learned that, in general, α-olefins (e.g., ethylene, propylene, 1-decene) are the most effective chain transfer agents.

The CTA can be employed in an amount ranging from about 0.10 mole % to over 50 mole % relative to the moles of total monomer. Preferably, the CTA is employed in the range of 0.10 to 10 mole %, and more preferably from 0.1 to 5.0 mole %. As discussed above, depending on catalyst type and sensitivities, CTA efficiencies and desired end group, the concentration of CTA can be in excess of 50 mole % (based on total monomer present), e.g., 60 to 80 mole %. Higher concentrations of CTA (e.g., greater than 100 mole %) may be necessary to achieve the low molecular weight embodiments of this invention such as in oligomer and macromonomer applications. It is important and surprising to note that even such high concentrations of CTA do not copolymerize into the polymer backbone but rather insert as a terminal end-groups on each polymer chain. Besides chain transfer, the process of the present invention affords a way by which a terminal α-olefinic end group can be placed at the end of a polymer chain.

The following examples are presented to further illustrate the present invention. There is no intent to limit the scope of the invention to the illustrative examples.

In the first section of the examples is described the preparation of various catalysts which are then used in the polymerizaitons described in the second section of the examples.

EXAMPLES

Preparation of Catalyst

Catalyst A

Hexafluoroantimonic acid (HSbF$_6$, 0.708 g, 3 mmole) was placed in a dry, nitrogen filled Teflon® bottle with a Teflon® cap/valve containing a magnetic stir-bar. The bottle was cooled in alcohol/dry ice and nickel ethylhexanoate (8% w Ni in mineral spirits, 3.8 ml, 3 mmole) was added and the contents were allowed to warm to room temperature. Catalyst A was stored for several days in a freezer with no apparent deterioration in performance.

Catalyst B

[($\eta^3$-crotyl)(cycloocta-1,5-diene)nickel] hexafluorophosphate

To a flask containing bis(cycloocta-1,5-diene)nickel (2.75 g, 10 mmol), was added a solution of crotyl bromide (1.35 g, 10 mmol) and butadiene (2.5 g) in toluene (24 ml). A deep-red solution of (crotyl)nickelbromide dimer resulted. After 2 hours at ambient temperature the solvent was removed under reduced pressure. To the resulting powder was added a solution of 1,5-cyclooctadiene (3.6 ml) in tetrahydrofuran (32 ml). After cooling to 0° C. thallium hexafluoro-phosphate (3.5 g, 10 mmol) was added to the resulting mixture which was then allowed to warm to ambient temperature and stir for one hour.

The solvent as stripped off under reduced pressure and dichloromethane (24 ml) was added. The insoluble thallium bromide was removed by filtration (under nitrogen) to afford the product as a solution in dichloromethane. This solution was reduced in volume and then diethylether was added to afford the catalyst, {B, [($\eta^3$-crotyl)(cycloocta-1,5-diene)nickel] hexafluorophosphate} (1.3 g) as orange crystals.

Catalyst C

Nickel ethylhexanoate (8% w Ni in mineral spirits, 0.01 ml, 13 μmol) was placed in a dry, nitrogen filled 10 ml glass vial containing a magnetic stir-bar. To this bottle was added a solution of dimethylanilinium tetrakisperfluorophenylborate (13 μmol) in 1,2-dichloroethane (2 ml). The catalyst solution was stirred at ambient temperature for 5 minutes prior to use.

Catalyst D

Hexafluoroantimonic acid (HSbF$_6$, 0.764 g, 3.22 mmole) was placed in a dry, nitrogen filled Teflon® bottle with a Teflon® cap/valve containing a magnetic stir-bar. The bottle was cooled in alcohol/dry ice and nickel ethylhexanoate (8% in mineral spirits, 1.31 ml, 1.69 mmole) was added and the contents were allowed to warm to room temperature. Catalyst D was stored for several days in a freezer with no apparent deterioration in performance.

Catalyst E

[($\eta^3$-crotyl)(cycloocta-1,5-diene)nickel] tetrakis(3,5-bis(trifluoromethyl)-phenyl) borate 3,5-bis(trifluoromethyl)bromobenzene (50 g, 170 mmol) in diethylether (150 ml) was added slowly (over about 2 hours) to magnesium powder (5.1 g, 210 mmol) followed by refluxing for about 3 hours to give a dark grey solution. Sodium tetrafluoroborate (3.4 g, 30 mmol) was added and the resulting slurry was refluxed for 24 hours. The reaction mixture was added to an aqueous solution of sodium carbonate (75 g in 1 liter), stirred 20 minutes, then filtered. The aqueous layer was separated and extracted 4 times with diethylether (200 ml aliquots). The ether layers were combined and dried over sodium sulfate and treated with decolorizing charcoal. The solvent was removed under high vacuum to afford an amber slush. Methylene chloride was added until the solid was thoroughly wetted, then chloroform was added and the resulting solid was filtered and dried. The recovered solid, sodium bis(trifluoromethyl)phenylborate (18 g, virtually quantitative yield) was in the form of a light tan, crystalline solid.

Cyclooctadiene (1.3 ml) in tetrahydrofuran (16 ml) was added to crotylnickelbromide dimer (0.5 g, 1.75 mmol). The mixture was cooled to 0° C. and the above described sodium bis(trifluoromethyl)phenylborate (3.1 g, 3.5 mmol) was added. The mixture was warmed to room temperature and stirred for 1 hour to give a clear, dark brown solution. The solvent was removed under vacuum and methylene chloride added to give a slightly hazy solution. The solution was filtered to give a clear, amber solution. The solvent was removed under vacuum, washed three times with hexane, filtered and dried under high vacuum to afford the product, [($\eta^3$-crotyl)-(cycloocta-1,5-diene)nickel] tetrakis(3,5-bis(trifluoromethyl)phenyl)borate (3.42 g) as a pale yellow powder.

Catalyst F

Inside an inert gas filled glove box a slurry of $\eta^3$-allylpalladium chloride dimer (13 μmol) in dichloroethane (1 ml) was added to a slurry of silver hexafluoroantimonate (13 μmol) in dichloroethane (1 ml) and stirred for 20 minutes. The precipitated silver chloride was filtered out using a micropore syringe filter to afford catalyst F [($\eta^3$-allylPd)$^+$SbF$_6^-$] (13 μmol) as a solution in dichloroethane.

Catalyst G

Firstly the ligand, bis-2,6-diisopropylphenyl-iminoacenaphthene was made according to the teachings of van Asselt et al., Recl. Trav. Chim. Pays-Bas 113, 88–98 (1994) to afford the material as small pale orange crystals. To a clean, dry 25 ml Kjeldahl flask equipped with a magnetic follower, was added (1,2-dimethoxyethane)nickel dichloride (0.44 g, 2.0 mmol) in dichloromethane (5 ml) and the ligand (1.0 g, 2.0 mmol) in dichloromethane (10 ml). The mixture was allowed to stir at ambient temperature for 30 minutes, but no apparent reaction occured. Most of the dichloromethane (10 mol) was removed under vacuum and 1,2-dimethoxyethane (10 ml) was added. The reaction proceeded immediately as witnessed by a color change to a deep red-brown. After 60 minutes the reaction mixture was heated to 50° C. for 15 minutes to ensure complete reaction. The solvent was removed, and the solid redissolved in 1,2-dichloroethane to afford a deep red solution which was filtered. The solvent was removed and the flask transferred to a dry box where the catalyst (catalyst G) was isolated in essentially quantitative yield.

Catalyst H $\eta^3$, $\eta^2,\eta^2$-dodeca-2(E),6(E),10(Z)-triene-1-ylniekel hexafluorophosphate The synthesis of this catalyst, the structure of which is represented below, is described by R. Taube et al, Makromol. Chem., Macromol. Symp., 66, (1993) 245–260 and in references cited in Taube et al.

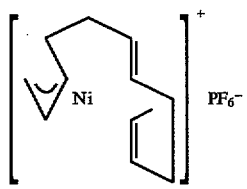

Preparation of Polymers

Example 1

Copolymerization of NB and Ethyl vinyl ether

To a 100 ml glass vial equipped with a Teflon® coated stirbar was added norbornene (5 g, 53.1 mmol), cyclohexane (35 ml) and ethylvinylether (2.0 ml, 20.9 mmol). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). Upon addition of the trialkylaluminum there ensued an exothermic reaction. The reaction was allowed to run for 60 minutes and then methanol was injected to kill the reaction and the polymer was washed with excess methanol and dried. The yield of copolymer was 4.3 g. In contrast to the two homopolymers (polynorbornene and polyethylvinylether) made with the same catalyst under the same conditions the copolymer was only soluble in solvents such as o-dichlorobenzene (o-DCB) or trichlorobenzene after extended heating, whereas the two homopolymers dissolve readily in these solvents at ambient temperature (and are even soluble in cyclohexane at ambient temperature).

The proton NMR of the copolymer showed the polymer to be devoid of olefinic unsaturation and to contain both monomers enchained. The protons located on the carbon atoms adjacent to the oxygen in the enchained ethylvinylether were found to resonate in the range 3.4 to 3.8 ppm relative to TMS (deuterated o-DCB solvent). The other protons resonated in the range 0.7 to 2.6 ppm. On the basis of this NMR data it was calculated that the copolymer comprised approximately 90 mole % norbornene and approximately 10 mole % ethylvinylether. 2D-COSY and $^{13}C$ NMR investigations confirmed that the two monomers are enchained in a random fashion in the same polymer backbone. GPC analysis showed the copolymer to have a molecular weight ($M_w$) of 725,000 and a polydispersity of 1.86. The copolymer could be cast from solution to afford a transparent film with much improved toughness compared to homopolynorbornene.

Example 2

Copolymerization of NB and Isobutylene in Cyclohexane

To a 100 ml glass vial equipped with a Teflon® coated stirbar was added norbornene (5 g, 53.1 mmol), cyclohexane (35 ml) and isobutylene (2.0 g, 35.7 mmol). To this stirred solution at ambient temperature was added a catalyst solution prepared as follows:

Catalyst A (0.012 g, 13 µmol), borontrifluorid.etherate (0.03 ml, 234 µmol) and triethylaluminum (0.16 ml of a 1.7 molar solution in cyclohexane, 260 µmol) were mixed at ambient temperature in 1,2-dichloroethane (0.6 ml) for approximately 30 seconds prior to addition.

After 60 minutes the reaction was terminated by injecting methanol (3 ml). The polymer was then washed with an excess of methanol and dried overnight in a heated vacuum oven to afford the product (2.9 g), a copolymer of norbornene and isobutylene. GPC analysis showed the copolymer to have a molecular weight ($M_w$) of 159,300 and a polydispersity of 2.38. The proton NMR data indicated that the copolymer comprised approximately 20 mole % isobutylene and 80 mole % norbornene.

Example 3

Copolymerization of NB and Isobutylene

To a 100 ml glass vial equipped with a Teflon® coated stirbar was added norbornene (5 g, 53.1 mmol), chlorobenzene (30 ml) and isobutylene (2.0 g, 35.7 mmol). To this stirred solution at ambient temperature was added a catalyst solution prepared as follows:

Catalyst A (0.012 g, 13 µmol), borontrifluoride.etherate (0.03 ml, 234 µmol) and triethylaluminum (0.16 ml of a 1.7 molar solution in cyclohexane, 260 µmol) were mixed at ambient temperature in 1,2-dichloroethane (0.6 ml) for approximately 30 seconds prior to addition.

After 60 minutes the reaction was terminated by injecting methanol (3 ml). The polymer was then washed with an excess of methanol and dried overnight in a heated vacuum oven to afford the product (4.2 g), a copolymer of norbornene and isobutylene. GPC analysis showed the copolymer to have a molecular weight ($M_w$) of 32,300 and a polydispersity of 2.17. The proton NMR data indicated that the copolymer comprised approximately 14 mole % isobutylene and 86 mole % norbornene.

Example 4

Copolymer of NB and Vinylanisole

To a 100 ml glass vial equipped with a Teflon® coated stirbar was added norbornene (5 g, 53.1 mmol), 1,2-dichloroethane (35 ml) and vinylanisole (1.0 ml, 7.52 mmol). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). Upon addition of the trialkylaluminum there ensued a very exothermic reaction and the bottle set-up solid with the copolymer formed. The reaction was allowed to run for 60 minutes and then methanol (3 ml) was injected to kill the reaction and the polymer was washed with excess methanol and dried. The yield of copolymer was 6.1 g indicating essentially quantitative conversion of both monomers.

The proton NMR of the copolymer (run in deuterated chloroform) showed the polymer to be devoid of olefinic unsaturation and to contain both monomers enchained. The protons located on the methoxy group were found to resonate at 3.7 ppm relative to TMS. The aromatic protons resonated in the range 6.4 to 6.9 ppm with the other protons resonating in the range 0.7 to 2.7 ppm. On the basis of this NMR data it was calculated that the copolymer comprised approximately 87 mole % norbornene and approximately 13 mole % vinylanisole. The copolymer molecular weight was determined using GPC techniques ($M_w$, 290,300; $M_n$ 36,000).

Example 5

Colpolymer of NB and Isobutylene

To a 100 ml glass vial equipped with a Teflon® coated stirbar was added norbornene (5 g, 53.1 mmol), 1,2-dichloroethane (35 ml) and isobutylene (2.0 g, 35.7 mmol). To this stirred solution at ambient temperature was added 1,3-bis(diphenylphosphino)propanenickel dichloride (7 mg, 13 µmol) in 1,2-dichloroethane (0.8 ml) followed by tris (pentafluorophenyl)boron (117 µmol in petroleum naphtha) and finally triethylaluminum (0.077 ml of a 1.7 molar solution in cyclohexane, 130 µmol). After 60 minutes the reaction was terminated by injecting methanol (3 ml). The polymer was then washed with an excess of methanol and dried overnight in a heated vacuum oven to afford the product (3.8 g), a copolymer of norbornene and isobutylene. GPC analysis showed the copolymer to have a molecular weight ($M_w$) of 17,000 and a polydispersity of 2.0.

Example 6

Colpolymer of NB and Isobutylene

To a 100 ml glass vial equipped with a Teflon® coated stirbar was added norbornene (5 g, 53.1 mmol), 1,2-dichloroethane (35 ml) and isobutylene (2.0 g, 35.7 mmol). To this stirred solution at ambient temperature was added bis(triphenylphosphine)nickel dichloride (8 mg, 13 µmol) in 1,2-dichloroethane (0.8 ml) followed by tris (pentafluorophenyl)boron (117 µmol in petroleum naphtha) and finally triethylaluminum (0.077 ml of a 1.7 molar solution in cyclohexane, 130 µmol). After 60 minutes the reaction was terminated by injecting methanol (3 ml). The polymer was then washed with an excess of methanol and dried overnight in a heated vacuum oven to afford the product (4.9 g), a copolymer of norbornene and isobutylene. GPC analysis showed the copolymer to have a molecular weight ($M_w$) of 17,000 and a polydispersity of 2.5.

Example 7

Homopolymerization of β-Pinene

To a 100 ml glass vial equipped with a Teflon® coated stirbar was added β-pinene (5 ml, 31.8 mmol) and 1,2-dichloroethane (35 ml). To this stirred solution at ambient temperature was added nickel ethylhexanoate (0.01 ml of an 8% w nickel solution in mineral spirits, 13 µmol), tris (pentafluorophenyl)boron (117 µmol in petroleum naphtha) and finally triethylauminum (0.077 ml of a 1.7 molar solution in cyclohexane, 130 µmol). Upon addition of the trialkylauminum there ensued an exothermic reaction. The reaction was allowed to run for 60 minutes and then methanol was injected to kill the reaction and the polymer was washed with excess methanol and dried overnight in a heated vacuum oven to afford the polymeric product (3.2 g). GPC analysis showed the polymer to have a molecular weight ($M_w$) of 20,500 and a polydispersity of 1.97.

Example 8

Homopolymerization of β-Pinene

To a 100 ml glass vial equipped with a Teflon® coated stirbar was added β-pinene (5 ml, 31.8 mmol) and 1,2-dichloroethane (35 ml). To this stirred solution at ambient temperature was added catalyst A (0.012 g, 13 µmol), borontrifluoride.etherate (117 µmol) and finally triethylaluminum (0.077 ml of a 1.7 molar solution in cyclohexane, 130 µmol). Upon addition of the trialkylaluminum there ensued an exothermic reaction. The reaction was allowed to run for 60 minutes and then methanol was injected to kill the reaction and the polymer was washed with excess methanol and dried overnight in a heated vacuum oven to afford the polymeric product (4.1 g). GPC analysis showed the polymer to have a molecular weight ($M_w$) of 22,000 and a polydispersity of 1.9.

Example 9

Copolymerization of Vinylcyclohexene Epoxide and Ethyl Vinyl Ether

To a 50 ml glass vial equipped with a Teflon® coated stirbar was added vinylcyclohexene-epoxide (2.5 ml, 19.2 mmol), 1,2-dichloroethane (30 ml) and ethylvinylether (2.5 ml, 26.1 mmol). To this stirred solution at ambient temperature was added a catalyst solution prepared as follows:

Catalyst A (0.012 g, 13 µmol), borontrifluoride.etherate (0.015 ml, 117 µmol) and triethylaluminum (0.08 ml of a 1.7 molar solution in cyclohexane, 130 µmol) were mixed at ambient temperature in 1,2-dichloroethane (2 ml) for approximately 30 seconds prior to addition.

Upon addition of the catalyst there ensued a very exothermic reaction. The reaction was allowed to run for 60 minutes and then methanol (3 ml) was injected to kill the reaction and the polymer was washed with excess methanol and dried. The yield of copolymer was 3.3 g. The proton NMR of the copolymer (run in deuterated chloroform) showed the polymer to contain both monomers enchained. On the basis of this NMR data it was calculated that the copolymer comprised approximately 43 mole % vinylcyclohexene-epoxide and approximately 57 mole % ethylvinylether. GPC analysis showed the polymer to have a molecular weight ($M_w$) of 28,500 and a polydispersity of 5.

Example 10

Copolymerization of NB and Butadiene

To a 100 ml glass vial equipped with a Teflon® coated stirbar was added norbornene (5 g, 53.1 mmol), 1,2-dichloroethane (35 ml) and butadiene (2.0 g, 37 mmol). To this stirred solution at ambient temperature was added catalyst A (0.012 g, 13 µmol), borontrifluoride.etherate (0.015 ml, 117 µmol) and triethylaluminum (0.08 ml of a 1.7 molar solution in cyclohexane, 130 µmol). After addition of the trialkylaluminum there ensued a rapid polymerization (very exothermic). After 60 minutes the reaction was terminated by injecting methanol (3 ml). The polymer was then washed with an excess of methanol and dried overnight in a heated vacuum oven to afford the product (4.9 g), a copolymer of norbornene and butadiene. The proton NMR data indicated that the copolymer comprised approximately 17 mole % butadiene and 83 mole % norbornene. GPC analysis showed the copolymer to have a molecular weight ($M_w$) of 10,000 and a polydispersity of 2.2.

Example 11

Copolymerization of NB and Butadiene

To a 100 ml glass vial equipped with a Teflon® coated stirbar was added norbornene (5 g, 53.1 mmol), 1,2-dichloroethane (35 ml) and butadiene (2.0 g, 37 mmol). To this stirred solution at ambient temperature was added nickel ethylhexanoate (13 µmol), tris(pentafluorophenyl)boron (117 µmol in petroleum naphtha) and finally triethylaluminum (0.077 ml of a 1.7 molar solution in cyclohexane, 130 µmol). Upon addition of the trialkylaluminum there ensued an exothermic reaction. The reaction was allowed to run for 60 minutes and then methanol was injected to kill the reaction and the polymer was washed with excess methanol and dried overnight in a heated vacuum oven to afford the polymeric product (4.8 g), a copolymer of norbornene and butadiene. The proton NMR data indicated that the copolymer comprised approximately 13 mole % butadiene and 87 mole % norbornene. GPC analysis showed the copolymer to have a molecular weight ($M_w$) of 13,100 and a polydispersity of 2.5.

Example 12

Copolymerization of Styrene and Butadiene

To a 100 ml glass vial equipped with a Teflon® coated stirbar was added styrene (5 ml, 43.6 mmol), 1,2- dichloroethane (35 ml) and butadiene (2.0 g, 37 mmol). To this stirred solution at ambient temperature was added nickel ethylhexanoate (13 µmol), tris(pentafluorophenyl)boron (117 µmol in petroleum naphtha) and finally triethylaluminum (0.077 ml of a 1.7 molar solution in cyclohexane, 130 µmol). Upon addition of the trialkylaluminum there ensued an exothermic reaction. The reaction was allowed to run for 60 minutes and then methanol was injected to kill the reaction and the polymer was washed with excess methanol and dried overnight in a heated vacuum oven to afford the polymeric product (1.7 g), a copolymer of styrene and butadiene. The proton NMR data indicated that the copolymer comprised approximately 75 mole % butadiene and 25 mole % styrene. GPC analysis showed the polymer to have a molecular weight ($M_w$) of 8,200 and a polydispersity of 3.5.

Example 13

Copolymerization of Styrene and Butadiene

To a 100 ml glass vial equipped with a Teflon® coated stirbar was added styrene (5 ml, 43.6 mmol), 1,2-dichloroethane (35 ml) and butadiene (2.0 g, 37 mmol). To this stirred solution at ambient temperature was added catalyst A (0.012 g, 13 µmol), borontrifluoride.etherate (0.015 ml, 117 µmol) and triethylaluminum (0.08 ml of a 1.7 molar solution in cyclohexane, 130 µmol). After addition of the trialkylaluminum there ensued a rapid polymerization (very exothermic). After 60 minutes the reaction was terminated by injecting methanol (3 ml). The polymer was then washed with an excess of methanol and dried overnight in a heated vacuum oven to afford the product (1.4 g), a copolymer of styrene and butadiene. The proton NMR data indicated that the copolymer comprised approximately 82 mole % butadiene and 18 mole % styrene. GPC analysis showed the polymer to have a molecular weight ($M_w$) of 8,000 and a polydispersity of 2.6.

Example 14

Copolymer of Vinylcyclohexene Epoxide and Vinylanisole

To a 100 ml glass vial equipped with a Teflon® coated stirbar was added vinylcyclohexene-epoxide (2.5 ml, 19.2 mmol), 1,2-dichloroethane (35 ml) and vinylanisole (2.5 ml, 18.8 mmol). To this stirred solution at ambient temperature was added nickel ethylhexanoate (0.01 ml of an 8% w nickel solution in mineral spirits, 13 µmol), tris (pentafluorophenyl)boron (117 µmol in petroleum naphtha) and finally triethylaluminum (0.077 ml of a 1.7 molar solution in cyclohexane, 130 µmol). Upon addition of the trialkylaluminum there ensued a very exothermic reaction. The reaction was allowed to run for 60 minutes and then methanol (3 ml) was injected to kill the reaction and the polymer was washed with excess methanol and dried. The yield of copolymer was 4.7 g.

The proton NMR of the copolymer (run in deuterated chloroform) showed the polymer to contain both monomers enchained. On the basis of this NMR data it was calculated that the copolymer comprised approximately 53 mole % vinylcyclohexene-epoxide and approximately 47 mole % vinylanisole. GPC analysis showed the copolymer to have a molecular weight ($M_w$) of 36,800 and a polydispersity of 2.8.

Example 15

Copolymerization of NB and Isobutylene

To a 100 ml glass vial equipped with a Teflon® coated stirbar was added norbornene (5 g, 53.1 mmol), 1,2-dichloroethane (35 ml) and isobutylene (5 g, 89 mmol). To this stirred solution at -7° C. was added catalyst A (0.012 g, 13 µmol), borontrifluorode.etherate (0.015 ml, 117 µmol) and triethylaluminum (0.08 ml of a 1.7 molar solution in cyclohexane, 130 µmol). After addition of the trialkylaluminum there ensued a rapid polymerization. After 60 minutes the reaction was terminated by injecting methanol (3 ml). The polymer was then washed with an excess of methanol and dried overnight in a heated vacuum oven to afford the product (3.9 g), a copolymer of norbornene and isobutylene. The proton NMR data indicated that the copolymer comprised approximately 41 mole % isobutylene and 59 mole % norbornene. The weight average molecular weight ($M_w$) was found to be 11,000 and the polydispersity 1.58. The glass transition temperature was measured using DSC techniques and found to be 182° C.

Example 16

Copolymerization of NB and Isobutylene

To a 100 ml glass vial equipped with a Teflon® coated stirbar was added norbornene (5 g, 53.1 mmol), 1,2-dichloroethane (35 ml) and isobutylene (0.5 g, 9 mmol). To this stirred solution at ambient temperature was added catalyst A (0.012 g, 13 µmol), borontrifluoride.etherate (0.015 ml, 117 µmol) and triethylaluminum (0.08 ml of a 1.7 molar solution in cyclohexane, 130 µmol). After addition of the trialkylaluminum there ensued a rapid polymerization. After 60 minutes the reaction was terminated by injecting methanol (3 ml). The polymer was then washed with an excess of methanol and dried overnight in a heated vacuum oven to afford the product (4.9 g), a copolymer of norbornene and isobutylene. The proton NMR data indicated that the copolymer comprised approximately 13 mole % isobutylene and 87 mole % norbornene. The weight average molecular weight ($M_w$) was found to be 116,000 and the polydispersity 2.9. The glass transition temperature was measured using DSC techniques and found to be 245° C.

Example 17

Homopolymerization of N-Vinylcarbazole

To a 50 ml glass vial equipped with a Teflon® coated stirbar was added N-vinylcarbazole (5.13 g, 26.5 mmol) and 1,2-dichloroethane (25 ml). To this stirred solution at ambient temperature was added catalyst B (4.6 mg, 13 µmol). After 10 minutes it was clear that the reaction was proceeding to high conversion since the whole polymerizing medium became exceedingly difficult to stir. After 60 minutes the reaction was terminated by injecting methanol (3 ml). The polymer was then washed with an excess of methanol and dried overnight in a heated vacuum oven to afford the product (4.95 g, 96.5% conversion). The weight average molecular weight ($M_w$) was found to be very high, 448,000 and the polydispersity 3.4.

Example 18

Copolymerization of Isobutylene and Butadiene

To a 200 ml glass vial equipped with a Teflon® coated stirbar was added heptane (90 ml), isobutylene (9.7 g, 174 mmol) and butadiene (0.19 g, 3.6 mmol). The vial was maintained at -40° C. To this stirred solution at -40° C. was added nickel ethylhexanoate (0.02 ml of an 8% w nickel solution in mineral spirits, 25 µmol) and ethylaluminum dichloride (0.044 ml of a 3.4 molar solution in cyclohexane, 150 µmol). After 60 minutes the reaction was terminated by injecting methanol (3 ml). The polymer was then washed with an excess of methanol and dried overnight in a heated vacuum oven to afford the product (2.5 g, 25% conversion). The copolymer was found by GPC to be of high molecular weight ($M_w$ 566,000 and $M_n$ 109,000).

Example 19

Homopolymerization of Isobutylene

To a 200 ml glass vial equipped with a Teflon® coated stirbar was added heptane (90 ml) and isobutylene (9.7 g, 174 mmol). The vial was maintained at −40° C. To this stirred solution at −40° C. was added nickel ethylhexanoate (0.02 ml of an 8% w nickel solution in mineral spirits, 25 µmol) and ethylaluminum dichloride (0.044 ml of a 3.4 molar solution in cyclohexane, 150 µmol). After 8 minutes stirring was lost due to viscosity and after 60 minutes the reaction was terminated by injecting methanol (3 ml). The polymer was then washed with an excess of methanol and dried overnight in a heated vacuum oven (50° C.) to afford the product (9.55 g, 96% conversion). The polyisobutylene was found by GPC to be of exceedingly high molecular weight ($M_w$ 1,072,000 and $M_n$ 195,000).

COMPARATIVE EXAMPLE

Homopolymerization of Isobutylene

This example demonstrates the MW increasing effect of nickel catalysis; in this case the nickel salt used in example 19 is deliberately omitted.

To a 200 ml glass vial equipped with a Teflon® coated stirbar was added heptane (95 ml) and isobutylene (5 g, 89 mmol). The vial was maintained at −40° C. To this stirred solution at −40° C. was added ethylaluminum dichloride (0.044 ml of a 3.4 molar solution in cyclohexane, 150 µmol). After 60 minutes the reaction was terminated by injecting methanol (3 ml). The polymer was then washed with an excess of methanol and dried overnight in a heated vacuum oven (50° C.) to afford the product (4.9 g, 98% conversion). The polyisobutylene was found by GPC to be of lower molecular weight ($M_w$ 228,000 and $M_n$ 59,000).

Example 20

Homopolymerization of Isobutylene

To a 200 ml glass vial equipped with a Teflon® coated stirbar was added heptane (90 ml) and isobutylene (10 g, 178 mmol). The vial was maintained at −40° C. To this stirred solution at −40° C. was added nickel ethylhexanoate (0.014 ml of an 8% w nickel solution in mineral spirits, 18 µmol) and ethylaluminum dichloride (0.026 ml of a 3.4 molar solution in cyclohexane, 90 µmol). After 60 minutes the reaction was terminated by injecting methanol (3 ml). The polymer was then washed with an excess of methanol and dried overnight in a heated vacuum oven (50° C.) to afford the product (3.92 g, 39% conversion). The polyisobutylene was found by GPC to be of exceedingly high molecular weight ($M_w$ 1,040,000 and $M_n$ 504,000).

COMPARATIVE EXAMPLE

Homopolymerization of Isobutylene

This example demonstrates the MW increasing effect of nickel catalysts; in this case the nickel salt used in example 20 is deliberately omitted.

To a 200 ml glass vial equipped with a Teflon® coated stirbar was added heptane (90 ml) and isobutylene (10 g, 178 mmol). The vial was maintained at −40° C. To this stirred solution at −40° C. was added ethylaluminum dichloride (0.0065 ml of a 3.4 molar solution in cyclohexane, 22 µmol). After 60 minutes the reaction was terminated by injecting methanol (3 ml). The polymer was then washed with an excess of methanol and dried overnight in a heated vacuum oven (50° C.) to afford the product (4.6 g, 46% conversion). The polyisobutylene was found by GPC to be of lower molecular weight ($M_w$ 300,000 and $M_n$ 123,000).

Example 21

Homopolymerization of Isobutylene

To a 200 ml glass vial equipped with a Teflon® coated stirbar was added heptane (90 ml) and isobutylene (10 g, 178 mmol). The vial was maintained at −40° C. To this stirred solution at −40° C. was added nickel ethylhexanoate (0.020 ml of an 8% w nickel solution in mineral spirits, 25 µmol) and ethylaluminum dichloride (0.037 ml of a 3.4 molar solution in cyclohexane, 125 µmol). After 60 minutes the reaction was terminated by injecting methanol (3 ml). The polymer was then washed with an excess of methanol and dried overnight in a heated vacuum oven (50° C.) to afford the product (3.4 g, 34% conversion). The polyisobutylene was found by GPC to be of exceedingly high molecular weight ($M_w$ 1,413,000).

Example 22

Copolymerization of Isobutylene and Isoprene

To a 200 ml glass vial equipped with a Teflon® coated stirbar was added heptane (90 ml), isobutylene (10 g, 178 mmol) and isoprene (0.36 ml, 0.25 g, 3.6 mmol). The vial was maintained at −40° C. To this stirred solution at −40° C. was added nickel ethylhexanoate (0.017 ml of an 8% w nickel solution in mineral spirits, 22 µmol) and ethylaluminum dichloride (0.039 ml of a 3.4 molar solution in cyclohexane, 132 µmol). After 60 minutes the reaction was terminated by injecting methanol (3 ml). The polymer was then washed with an excess of methanol and dried overnight in a heated vacuum oven (50° C.) to afford the product (6.4 g, 64% conversion). The resulting butyl rubber was found by GPC to be of high molecular weight ($M_w$ 156,000 and $M_n$ 86,000). The isoprene content was found to 0.73% 1,4 units and 0.15% branching units (total 0.88% mole). The isoprene incorporation type and level was determined by proton NMR methods following the teachings of White et al., *Macromolecules* 1995, 28, 3290–3300.

Example 23

Copolymerization of NB and Isobutylene

To a 50 ml glass vial equipped with a Teflon® coated stirbar and cooled to −20° C. was added norbornene (9 g, 96 mmol diluted in 9 g 1,2-dichloroethane), 1,2-dichloroethane (40 ml) and isobutylene (1 g, 18 mmol). To this stirred solution at 40° C. was added catalyst A (0.012 g, 13 µmol), borontrifluoride.etherate (0.015 ml, 121 µmol) and triethylaluminum (0.08 ml of a 1.7 molar solution in cyclohexane, 130 µmol). After 60 minutes the reaction was terminated by injecting methanol (3 ml). The polymer was then washed with an excess of methanol and dried overnight in a heated vacuum oven to afford the product (8.19 g), a copolymer of norbornene and isobutylene. The proton NMR data indicated that the copolymer comprised approximately 18 mole % isobutylene and 82 mole % norbornene. The weight average molecular weight ($M_w$) was found to be 115,000 and the number average molecular weight ($M_n$) was found to be 55,000. The glass transition temperature was measured using DSC techniques and found to be 337° C. A sample of this copolymer was subjected to a Soxhlet extraction for 24 hours using 1,2-dichloroethane (a solvent for polyisobutylene) as the extractant. Almost 8% w of the isobutylene-rich (proton NMR) copolymer was extracted leaving a residue containing 11 mole % isobutylene with a weight average molecular weight ($M_w$) of 113,000 and a number average molecular weight ($M_n$) of 54,000. The extract was analyzed using mass spectrometry and it was found to contain a variety of fragments containing both norbornene and isobutylene (e.g. 2 norbornenes and 1 isobutylene, 1 norbornene and 5 isobutylenes, 2 norbornenes and 2 isobutylenes etc.) demonstrating enchainment of both monomers in the same backbone.

Example 24

Copolymerization of NB and Isobutylene

To a 100 ml glass vial equipped with a Teflon® coated stirbar and cooled to –20° C. was added norbornene (9 g, 96 mmol diluted in 9 g 1,2-dichloroethane), 1,2-dichloroethane (40 ml) and isobutylene (1 g, 18 mmol). To this stirred solution at 20° C. was added catalyst A (0.022 g, 18.5 µmol), borontrifluoride.etherate (0.020 ml, 166 µmol) and triethylaluminum (0.109 ml of a 1.7 molar solution in cyclohexane, 185 µmol). After 60 minutes the reaction was terminated by injecting methanol (3 ml). The polymer was then washed with an excess of methanol and dried overnight in a heated vacuum oven to afford the product (8.52 g), a copolymer of norbornene and isobutylene. The proton NMR data indicated that the copolymer comprised approximately 20 mole % isobutylene and 80 mole % norbornene. The weight average molecular weight ($M_w$) was found to be 201,000 and the number average molecular weight ($M_n$) was found to be 71,000. A sample of this copolymer was subjected to a Soxhlet extraction for 24 hours using 1,2-dichloroethane (a solvent for polyisobutylene) as the extractant. Almost 20% w of the isobutylene-rich (proton NMR) copolymer was extracted leaving a residue with a weight average molecular weight ($M_w$) of 204,000 and a number average molecular weight ($M_n$) of 76,000. The extract was analyzed using mass spectrometry and it was found to contain a variety of fragments containing both norbornene and isobutylene (e.g. 2 norbornenes and 1 isobutylene, 1 norbornene and 4 isobutylenes, 2 norbornenes and 2 isobutylenes etc.) demonstrating enchainment of both monomers in the same backbone.

Example 25

Copolymerization of NB and Isobutylene

To a 100 ml glass vial equipped with a Teflon® coated stirbar and cooled to –20° C. was added norbornene (5 g, 53 mmol diluted in 5 g 1,2-dichloroethane), 1,2-dichloroethane (35 ml) and isobutylene (5 g, 89 mmol). To this stirred solution at –20° C. was added catalyst E (0.050 g, 45 µmol). After 60 minutes the reaction was terminated by injecting methanol (3 ml). The polymer was then washed with an excess of methanol and dried overnight in a heated vacuum oven to afford the product (4.0 g), a copolymer of norbornene and isobutylene. The proton NMR dam indicated that the copolymer comprised approximately 16 mole % isobutylene and 84 mole % norbornene and showed the presence of a single type of olefinic end group (polymer-NB—$CH_2C(CH_3)$=$CH_2$) at 4.7 ppm relative to TMS (in deuterochloroform). The weight average molecular weight ($M_w$) was found to be 7,200 and the number average molecular weight ($M_n$) was found to be 3,500.

Example 26

Copolymerization of Isobutylene and Isoprene

To a 200 ml glass vial equipped with a Teflon® coated stirbar was added heptane (95 ml), isobutylene (4.9 g, 87 mmol) and isoprene (0.18 ml, 0.12 g, 1.8 mmol). The vial was maintained at –75° C. To this stirred solution at –75° C. was added nickel ethylhexanoate (0.010 ml of an 8% w nickel solution in mineral spirits, 13 µmol) and ethylaluminum dichloride (0.16 ml of a 0.5 molar solution in cyclohexane, 78 µmol). After 60 minutes the reaction was terminated by injecting methanol (3 ml). The polymer was then washed with an excess of methanol and dried overnight in a heated vacuum oven (50° C.) to afford the product (2.8 g, 56% conversion). The resulting butyl rubber was found by GPC to be of high molecular weight ($M_w$ 136,000 and $M_n$ 61,000). The isoprene content was found to 1.37% 1,4 units and 0.22% branching units units (total 1.6% mole).

Example 27

Copolymerization of Isobutylene and Isoprene

To a 200 ml glass vial equipped with a Teflon® coated stirbar was added heptane (95 ml), isobutylene (4.9 g, 87 mmol) and isoprene (0.18 ml, 0.12 g, 1.8 mmol). The vial was maintained at –40° C. To this stirred solution at –40° C. was added nickel ethylhexanoate (0.010 ml of an 8% w nickel solution in mineral spirits, 13 µmol) and isobutylaluminum dichloride (0.16 ml of a 0.5 molar solution in cyclohexane, 78 µmol). After 60 minutes the reaction was terminated by injecting methanol (3 ml). The polymer was then washed with an excess of methanol and dried overnight in a heated vacuum oven (50° C.) to afford the product (1.6 g, 32% conversion). The resulting butyl rubber was found by GPC to be of high molecular weight ($M_w$ 105,000 and $M_n$ 48,000). The isoprene content was found to 1.0% 1,4 units and 0.3% branching units (total 1.3% mole).

Example 28

Homopolymerization of β-Pinene

To a 50 ml glass vial equipped with a Teflon® coated stirbar was added β-pinene (8.4 ml, 53.1 mmol) and 1,2-dichloroethane (35 ml). To this stirred solution at ambient temperature was added nickel ethylhexanoate (0.01 ml of an 8% w nickel solution in mineral spirits, 13 µmol) and ethylaluminumdichloride (0.035 ml of a 50% solution in hexanes). The reaction was allowed to run for 60 minutes and then methanol was injected to kill the reaction and the polymer was washed with excess methanol and dried overnight in a heated vacuum oven to afford the polymeric product (0.2 g). GPC analysis showed the polymer to have a molecular weight ($M_w$) of 20,100 and a polydispersity of 2.7.

Example 29

Copolymerization of NB and β-Pinene

To a 50 ml glass vial equipped with a Teflon® coated stirbar was added β-pinene (4.2 ml, 26.5 mmol), norbornene (2.5 g, 26.5 mmol) and heptane (35 ml). To this stirred solution at ambient temperature was added nickel ethylhexanoate (0.01 ml of an 8% w nickel solution in mineral spirit, 13 µmol) and ethylaluminumdichloride (0.035 ml of a 50% solution in hexanes). The reaction was allowed to run for 60 minutes and then methanol was injected to kill the reaction and the polymer was washed with excess methanol and dried overnight in a heated vacum oven to afford the copolymer (3.5 g). GPC analysis showed the polymer to have a molecular weight ($M_w$) of 806,000 and a polydispersity of 2.5.

Example 30

Homopolymerization of Isobutylene

To a 100 ml glass vial equipped a Teflon® coated stirbar was added cyclohexane (45 ml), norbornene (5 g, 53 mmol) and isobutylene (5 g, 89 mmol). To this stirred solution at ambient temperature was added palladium ethylhexanoate (0.007 ml of a 3.07 molar solution in mineral spirits, 21 µmol) and ethylaluminumdichloride (0.023 ml of a 50% solution in hexanes, 78 µmol). The reaction was allowed to run for 2 hours and then methanol was injected to kill the reaction and the polymer was washed with excess methanol and dried overnight in a heated vacuum oven to afford the copolymer (3.62 g). GPC analysis showed the polymer to have a weight average molecular weight ($M_w$) of 107,000 and a number average molecular weight ($M_n$) of 60,000.

Example 31

Homopolymerization of NB and Isobutylene

To a 100 ml glass vial equipped with a Teflon® coated stirbar was added cyclohexane (45 ml), norbornene (5 g, 53 mmol) and isobutylene (5 g, 89 mmol). To this stirred solution at −20° C. was added palladium ethylhexanoate (0.013 ml of a 3.07 molar solution in mineral spirits, 38 µmol) and ethylaluminumdichloride (0.056 ml of a 50% solution in hexanes, 190 µmol). The reaction was allowed to run for 60 minutes and then methanol was injected to kill the reaction and the polymer was washed with excess methanol and dried overnight in a heated vacuum oven to afford the copolymer (5.98 g). GPC analysis showed the polymer, which dissolved in hot o-dichlorobenzene, to have a weight average molecular weight ($M_w$) of 218,000 and a number average molecular weight ($M_n$) of 177,000.

Example 32

Copolymerization of NB and Isobutylene

To a 50 ml glass vial equipped with a Teflon® coated stirbar was added norbornene (5 g, 53.1 mmol), 1,2-dichloroethane (35 ml) and isobutylene (2.0 g, 35.7 mmol). To this stirred solution at ambient temperature was added nickel ethylhexanoate (0.01 ml of an 8% w nickel solution in mineral spirits, 13 µmol), borontrifluoride.etherate (0.015 ml, 117 µmol) and triethylaluminum (0.08 ml of a 1.7 molar solution in cyclohexane, 130 µmol). After 60 minutes the reaction was terminated by injecting methanol (3 ml). The polymer was then washed with an excess of methanol and dried overnight in a heated vacuum oven to afford the product (3.0 g), a copolymer of norbornene and isobutylene. The proton NMR data indicated that the copolymer comprised approximately 10 mole % isobutylene and 90 mole % norbornene. The weight average molecular weight ($M_w$) was found to be 28,300 and the polydispersity 1.98.

Example 33

Copolymerization of Isobutylene and Butadiene

To a 50 ml glass vial equipped with a Teflon® coated stirbar was added isobutylene (6.02 g, 107.5 mmol), 1,2 dichloroethane (3 ml) and butadiene (0.30 g, 5.6 mmol). The vial was maintained at −40° C. To this stirred solution at −40° C. was added nickel ethylhexanoate (0.01 ml of an 8% w nickel solution in mineral spirits, 13 µmol) and ethylaluminum dichloride (0.044 ml of a 1.8 molar solution in toluene, 68 µmol). After 60 minutes the reaction was terminated by injecting methanol (3 ml). The polymer was then washed with an excess of methanol and dried overnight in a heated vacuum oven to afford the product (3.2 g, 50% conversion). The copolymer molecular weight was determined by GPC ($M_w$ 37,300 and $M_n$ 4,000).

Example 34

Copolymerization of Vinylcyclohexene Epoxide and Ethyl Vinyl Ether

To a 50 ml glass vial equipped with a Teflon® coated stirbar was added vinylcyclohexene-epoxide (2.5 ml, 19.2 mmol), cyclohexane (35 ml) and ethylvinylether (2.5 ml, 26.1 mmol). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). The reaction was allowed to run for 60 minutes and then methanol (3 ml) was injected to kill the reaction and the polymer was washed with excess methanol and dried. The yield of copolymer was 3.8 g.

The proton NMR of the copolymer (run in deuterated chloroform) showed the polymer to contain both monomers enchained. On the basis of this NMR data it was calculated that the copolymer comprised approximately 52 mole % ethhylvinylether and approximately 48 mole % cyclohexene epoxide. GPC analysis showed the copolymer to have a molecular weight ($M_w$) of 38,900 and a polydispersity of 3.2.

Example 35

Homopolymerization of Ethyl Vinyl Ether

To a 50 ml glass vial equipped with a Teflon® coated stirbar was added cyclohexane (35 ml) and ethylvinylether (5 ml, 52.2 mmol). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). Upon addition of the triethylaluminum there ensued a very exothermic reaction. The reaction was allowed to run for 60 minutes and then methanol (3 ml) was injected to kill the reaction and the solution was poured into an excess of methanol, in which the ethylvinylether homopolymer was soluble. The methanol and other volatiles were removed under high vacuum to afford the homopolymer as a tacky semi-solid which was characterized by proton NMR as the homopolymer of ethylvinylether. The polymer had a pale yellow coloration (presumably due to catalyst residues which had not been removed).

Example 36

Copolymerization of NB and α-Methylstyrene

To a 50 ml glass vial equipped with a Teflon® coated stirbar was added norbornene (4.6 g, 48.9 mmol), chlorobenzene (35 ml) and α-methylstyrene (2.5 ml). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol ). Upon addition of the triethylaluminum there ensued a very exothermic reaction. The reaction was allowed to run for 60 minutes and then methanol (3 ml) was injected to kill the reaction and the polymer was washed with excess methanol and dried. The yield of copolymer was 4.9 g. GPC analysis showed the copolymer to have a molecular weight ($M_w$) of 69,400 and a polydispersity of 2.8.

Example 37

Copolymerization of NB and Ethyl Vinyl Ether

To a 50 ml glass vial equipped with a Teflon® coated stirbar was added norbornene (2.5 g, 26.5 mmol), cyclohexane (30 ml) and ethylvinylether (5.0 ml, 52.2 mmol). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). Upon addition of the trialkylaluminum there ensued an exothermic reaction. The reaction was allowed to run for 60 minutes and then methanol was injected to kill the reaction and the polymer was washed with excess methanol and dried. The yield of copolymer was 2.5 g. In contrast to the two homopolymers (polynorbornene and polyethylvinylether) made with the same catalyst under the same conditions the copolymer was only soluble in solvents such as o-dichlorobenzene (o-DCB) or trichlorobenzene after extended heating, whereas the two homopolymers dissolve readily in these solvents at ambient temperature (and are even soluble in cyclohexane at ambient temperature).

Example 38

Copolymerization of NB and n-Butyl Vinyl Ether

To a 50 ml glass vial equipped with a Teflon® coated stirbar was added norbornene (5 g, 53.1 mmol), cyclohexane (25 ml) and n-butylvinylether (2.5 ml). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). Upon addition of the trialkylaluminumn there ensued a slightly exothermic reaction. The reaction was allowed to run for 60 minutes and then methanol was injected to kill the reaction and the polymer was washed with excess methanol and dried. The yield of copolymer was 2.1 g.

Example 39

Copolymerization of NB and Ethyl Vinyl Ether

To a 50 ml glass vial equipped with a Teflon® coated stirbar was added norbornene (5 g, 53.1 mmol), chlorobenzene (25 ml) and ethylvinylether (2.5 ml, 26.1 mmol). To this stirred solution at ambient temperature was added nickel ethylhexanoate (0.01 ml of an 8% w nickel solution in mineral spirits, 13 µmol), tris(pentafluorophenyl)boron (117 µmol in petroleum naphtha) and finally triethylaluminum (0.077 ml of a 1.7 molar solution in cyclohexane, 130 µmol). Immediately upon addition of the trialkylaluminum there ensued an extremely exothermic reaction. The reaction was allowed to run for 15 minutes, by which time the polymerizing medium had tamed into an almost solid mass, and then methanol (3 ml) was injected to kill the reaction and the polymer was washed with excess methanol and dried. The yield of copolymer was 5.9 g. In contrast to the two homopolymers (polynorbornene and polyethylvinylether) made with the same catalyst the copolymer was insoluble in trichlorobenzene after extended heating, whereas the two homopolymers dissolve readily in this solvent at ambient temperature (and are even soluble in cyclohexane at ambient temperature).

COMPARATIVE EXAMPLE

Attempted Copolymerization of NB and Ethyl Vinyl Ether

This example demonstrates that the poylmerization is initiated by the nickel catalyst (the nickel compound used in example 42 being deliberately omitted) and not via a simple carbocationic mechanism involving Lewis acids.

To a 50 ml glass vial equipped with a Teflon® coated stirbar was added norbornene (5 g, 53.1 mmol), chlorobenzene (25 ml) and ethylvinylether (2.5 ml, 26.1 mmol). To this stirred solution at ambient temperature was added tris(pentafluorophenyl)boron (117 µmol in petroleum naphtha) and triethylaluminum (0.077 ml of a 1.7 molar solution in cyclohexane, 130 µmol). The reaction was allowed to run for 60 minutes after which time there was no polymer precipitate nor noticeable viscosity and then methanol (3 ml) was injected to kill the reaction and the resulting solution was poured into excess methanol but no product precipitated.

Example 40

Copolymerization of NB and Ethyl Vinyl Ether

To a 50 ml glass vial equipped with a Teflon® coated stirbar was added norbornene (5 g, 53.1 mmol), chlorobenzene (35 ml) and ethylvinylether (2.5 ml, 26.1 mmol). To this stirred solution at ambient temperature was added catalyst F (13 µmol as a solution in 2 ml dichloroethane). The reaction was allowed to run for 24 hours after which time the contents of the flask had turned into an easily stirred milky mass. The polymerizing white mass was poured into excess methanol, filtered, washed with further methanol and dried. The yield of copolymer was 4.5 g. The proton NMR of the copolymer showed the polymer to be devoid of olefinic unsaturation and to contain both monomers enchained. The protons located on the carbon atoms adjacent to the oxygen in the enchained ethylvinylether were tuned to resonate in the range 3.4 to 3.8 ppm relative to TMS (deuterated o-DCB solvent). The other protons resonated in the range 0.8 to 2.9 ppm. On the basis of this NMR data it was calculated that the copolymer comprised approximately 89 mole % norbornene and approximately 11 mole % ethylvinylether. GPC methods showed the copolymer to be of very high molecular weight ($M_w$ in excess of 1,000,000)

Example 41

Homopolymerization of Ethyl Vinyl Ether

To a 50 ml glass vial equipped with a Teflon® coated stirbar was added 1,2-dichloroethane (35 ml) and ethylvinylether (2.5 ml, 26.1 mmol). To this stirred solution at ambient temperature was added catalyst G (8.2 mg, 13 µmol) in 1,2-dichloroethane (2 ml) followed by ethylaluminum dichloride (0.028 ml of a 1.8 molar solution in toluene 52 µmol). upon addition of the alkylaluminum there was an immediate color change (to red-brown) and there ensued a very exothermic reaction. The reaction was allowed to run for 60 minutes and then methanol (3 ml) was injected to kill the reaction.

Example 42

Homopolymerization of Isobutylene

To a 50 ml glass vial equipped with a Teflon® coated stirbar was added 1,2-dichloroethane (40 ml) and isobutylene (5 g, 89.2 mmol). To this stirred solution at ambient temperature was added catalyst G (8.2 mg, 13 µmol) in 1,2-dichloroethane (2 ml) followed by ethylaluminum dichloride (0.028 ml of a 1.8 molar solution in toluene 52 μmol). Upon addition of the alkylaluminum there was an immediate color change (to red) followed by a second color change (to purple) after about 60 seconds and there ensued a very exothermic reaction. The reaction was allowed to run for 60 minutes and then methanol (3 ml) was injected to kill the reaction.

Example 43

Copolymerization of NB and β-Pinene

To a 50 ml glass vial equipped with a Teflon® coated stirbar was added -pinene (2.5 ml), norbornene (5 g, 53.1 mmol) and chlorobenzene (35 ml). To this stirred solution at ambient temperature was added nickel ethylhexanoate (0.01 ml of an 8% w nickel solution in mineral spirits, 13 μmol) tris(pentafluorophenyl)boron (117 μmol in petroleum naphtha) and triethylaluminum (0.077 ml of a 1.7 molar solution in cyclohexane, 130 μmol). Immediately upon addition of the trialkylaluminum the reaction mixture became yellow and hot. The reaction was allowed to run for 60 minutes after which time methanol (3 ml) was injected to kill the reaction and the resulting solution was poured into excess methanol. The polymer was filtered off and washed with excess methanol and dried overnight in a heated vacuum oven to afford the copolymer (4.0 g). GPC analysis showed the polymer to have a molecular weight ($M_w$) of 39,800 and a polydispersity of 2.1.

Example 44

Copolymerization of NB and Isobutylene

To a 100 ml glass vial equipped with a Teflon® coated stirbar was added norbornene (5 g, 53.1 mmol), cyclohexane (50 ml) and isobutylene (5 g, 89 mmol). To this stirred solution at 10° C. was added catalyst A (0.024 ml, 28 μmol), borontrifluoride.etherate (0.031 ml, 252 μmol) and finally triethylaluminum (0.165 ml of a 1.7 molar solution in cyclohexane, 280 μmol).

After 60 minutes the reaction was terminated by injecting methanol (3 ml). The polymer was then washed with an excess of methanol and dried overnight in a heated vacuum oven to afford the product (2.28 g), a copolymer of norbornene and isobutylene. GPC analysis showed the copolymer to have a molecular weight ($M_w$) of 158,000 and exhibited a glass transition temperature of 267° C.

Example 45

Copolymerization of NB and Isobutylene

To a 100 ml glass vial equipped with a Teflon® coated stirbar was added norbornene (9 g, 96 mmol), chlorobenzene (50 ml) and isobutylene (1 g, 18 mmol). To this stirred solution at ambient temperature was added catalyst A (0.024 ml, 28 μmol), triethylborate (B(OEt)$_3$) (0.043 ml, 252 μmol) and finally triethylaluminum (0.165 ml of a 1.7 molar solution in cyclohexane, 280 μmol).

After 60 minutes the reaction was terminated by injecting methanol (3 ml). The polymer was then washed with an excess of methanol and dried overnight in a heated vacuum oven to afford the product (8.17 g, 82%), a copolymer of norbornene and isobutylene. GPC analysis showed the copolymer to have a molecular weight ($M_w$) of 62,000.

Example 46

Copolymerization of NB and Isobutylene

To a 100 ml glass vial equipped with a Teflon® coated stirbar was added norbornene (5 g, 53.1 mmol), cyclohexane (50 ml) and isobutylene (5 g, 89 mmol). To this stirred solution at ambient temperature was added catalyst A (0.024 ml, 28 μmol), triethylborate (B(OEt)$_3$) (0.043 ml, 252 μmol) and finally triethylaluminum (0.165 ml of a 1.7 molar solution in cyclohexane, 280 μmol).

After 60 minutes the reaction was terminated by injecting methanol (3 ml). The polymer was then washed with an excess of methanol and dried overnight in a heated vacuum oven to afford the product (1.65 g, 17%), a copolymer of norbornene and isobutylene. GPC analysis showed the copolymer to have a molecular weight ($M_w$) of 284,000.

Example 47

Copolymerization of NB and Ethyl Vinyl Ether

To a 50 ml glass vial equipped with a Teflon® coated stirbar was added norbornene (5 g, 53.1 mmol), chlorobenzene (35 ml), ethylvinylether (0.5 ml) and 1-hexene (1.0 ml) as chain transfer agent. To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). Upon addition of the trialkylaluminum there ensued an exothermic reaction. The reaction was allowed to run for 60 minutes and then methanol was injected to kill the reaction and the polymer was washed with excess methanol and dried. The yield of copolymer was 1.4 g. GPC analysis showed the copolymer to have a molecular weight ($M_w$) of 217,000. and a polydispersity of 3.1. The proton NMR spectrum indicated the presence of an olefinic end group (resonances in the range 5.3 to 5.7 ppm relative to TMS), and the copolymer to comprise roughly 13 mol % ethylvinylether and 87 mol % norbornene.

Example 48

Homopolymerization of Propylene Oxide

To a 50 ml glass vial equipped with a Teflon® coated stirbar was added propylene oxide (5 ml, 4.15 g) and chlorobenzene (35 ml). To this stirred solution at ambient temperature was added nickel ethylhexanoate (0.01 ml of an 8% w nickel solution in mineral spirits, 13 μmol), tris (pentafluorophenyl)boron (117 μmol in petroleum naphtha) and finally triethylaluminum (0.077 ml of a 1.7 molar solution in cyclohexane, 130 μmol). Upon addition of the trialkylaluminum there ensued an exothermic reaction. The reaction was allowed to run for 60 minutes and then methanol was injected to kill the reaction. The liquid product (4.1 g, essentially quantitative conversion) was isolated by evaporating the solution to dryness under high vacuum.

Example 49

Copolymerization of NB and Propylene Oxide

To a 50 ml glass vial equipped with a Teflon® coated stirbar was added norbornene (5 g, 53.1 mmol), propylene oxide (2.5 ml) and chlorobenzene (35 ml). To this stirred solution at ambient temperature was added nickel ethylhexanoate (0.01 ml of an 8% w nickel solution in mineral spirits, 13 μmol), tris(pentafluorophenyl)boron (117 μmol in petroleum naphtha) and finally triethylaluminum (0.077 ml of a 1.7 molar solution in cyclohexane, 130 μmol). Upon addition of the trialkylaluminum there ensued an exothermic reaction. The reaction was allowed to run for 60 minutes and then methanol was injected to kill the reaction. The product (1.6 g), a tacky white semi-solid, was isolated by evaporating the solution to dryness under high vacuum. The proton NMR revealed the copolymer to comprise mainly propylene oxide with a low level of norbornene units incorporated into the backbone.

Example 50

Copolymerization of NB and Diisobutylene

To a 100 ml glass vial equipped with a Teflon® coated stirbar was added norbornene (5 g, 53.1 mmol), chlorobenzene (35 ml) and diisobutylene (5.6 ml, 35.7 mmol). To this stirred solution at ambient tempeature was added a catalyst solution prepared as follows:

Catalyst A (0.012 g, 13 µmol), borontrifluoride etherate (0.03 ml, 234 µmol) and triethylaluminum (0.16 ml of a 1.7 molar solution in cyclohexane, 260 µmol) were mixed at ambient temperature in 1,2-dichloroethane (0.6 ml) for approximately 30 seconds prior to addition.

After 60 minutes the reaction was terminated by injecting methanol (3 ml). The polymer was then washed with an excess of methanol and dried overnight in a heated vacuum oven to afford the product (4.2 g), a copolymer of norbornene and diisobutylene. GPC analysis showed the copolymer to have a molecular weight (Mw) of 217,700 and a polydispersity of 1.95. The proton NMR data indicated that the copolymer comprised approximately 6 mole % diisobutylene and 94 mole % norbornene.

Example 51

Copolymerization of NB and Triisobutylene

To a 100 ml glass vial equipped with a Teflon® coated stirbar was added norbornene (5 g, 53.1 mmol), chlorobenzene (35 ml) and triisobutylene (6.7 ml, 35.7 mmol). To this stirred solution at ambient temperature was added nickel ethylhexanoate (13 µmol), tris(pentafluorophenyl)boron (117 µmol in petroleum naphtha) and finally triethylaluminum (0.77 ml of a 1.7 molar solution in cyclohexane, 130 µmol). Upon addition of the trialkylaluminum there ensued an exothermic reaction. The reaction was allowed to run for 60 minutes and then methanol was injected to kill the reaction and the polymer was washed with excess methanol and dried overnight in a heated vacuum oven to afford the polymeric product (3.4 g), a copolymer of norbornene and triisobutylene. The proton NMR data indicated that the copolymer comprised approximately 11 mole % triisobutylene and 89 mole % norbornene. GPC analysis showed the copolymer to have a molecular weight (Mw) of 340,600 and a polydispersity of 4.6.

Example 52

Copolymerization of NB and Triisobutylene

To a 100 ml glass vial equipped with a Teflon® coated stirbar was added norbornene (5 g, 53.1 mmol), chlorobenzene (35 ml) and triisobutylene (5.6 ml, 35.7 mmol). To this stirred solution at ambient temperature was added nickel ethylhexanoate (13 µmol), tris(pentafluorophenyl)boron (117 µmol in petroleum naphtha) and finally triethylaluminum (0.077 ml of a 1.7 molar solution in cyclohexane, 130 µmol). Upon addition of the trialkylaluminum there ensued an exothermic reaction. The reaction was allowed to run for 60 minutes and then methanol was injected to kill the reaction and the polymer was washed with excess methanol and dried overnight in a heated vacuum oven to afford the polymeric product (4.0 g), a copolymer of norbornene and triisobutylene. The proton NMR data indicated that the copolymer comprised approximately 9 mole % triisobuty-lene and 91 mole % norbornene. GPC analysis showed the copolymer to have a molecular weight (Mw) of 121,300 and a polydispersity of 2.1

Example 53

Copolymerization of NB and Caprolactone

To a 100 ml glass vial equipped with a Teflon® coated stirbar was added norbornene (5 g, 53.1 mmol), chlorobenzene (40 ml) and ε-caprolactone (2.5 ml). To this stirred solution at ambient temperature was added nickel ethylhexanoate (0.01 ml of an 8% w nickel solution in mineral spirits, 13 µmol ), tris(pentafluorophenyl)boron (117 µmol in petroleum naphtha) and finally triethylaluminum (0.077 ml of a 1.7 molar solution in cyclohexane, 130 µmol). Upon addition of the trialkylaluminum there ensued an exothermic reaction. The reaction was allowed to run for 60 minutes during which time the temperature of the mixture gradually increased and the copolymer precipitated from solution to give a very viscous slurry. Methanol was injected to kill the reaction and the polymer was washed with excess methanol and dried. The yield of copolymer was 4.9 g. In contrast to the two homopolymers (polynorbornene and poly-ε-caprolactone) made with the same catalyst under the same conditions the copolymer was only soluble in solvents such as o-dichlorobenzene (o-DCB) or trichlorobenzene after extended heating, whereas the two homopolymers dissolve readily in these solvents at ambient temperature (and are even soluble in cyclohexane at ambient temperature).

On the basis of proton NMR data, it is calculated that the copolymer comprised approximately 98 mole % norbornene and approximately 2 mole % ε-caprolactone.

Example 54

Homopolymerization of Caprolactone

To a 50 ml glass vial equipped with a Teflon® coated stirbar was added ε-caprolactone (5 ml) and chlorobenzene (35 ml). To this stirred solution at ambient temperature was added nickel ethylhexanoate (0.01 ml of an 8% w nickel solution in mineral spirits, 13 µmol), tris(pentafluorophenyl) boron (117 µmol in petroleum naphtha) and finally triethylaluminum (0.077 ml of a 1.7 molar solution in cyclohexane, 130 µmol). Upon addition of the trialkylaluminum there ensued a slow reaction. The reaction was allowed to run for 60 minutes after which methanol was injected to kill the reaction and the polymer was isolated as a waxy solid by evaporating to dryness and drying overnight in a heated vacuum oven (yield 3.0 g).

Examples 55 and 56

Following the procedure of Example 37, employing the same catalyst, solvent and molar ratios of the various components, the following monomers were polymerized yielding the appropriate copolymers having the indicated molecular weights (Mw).

| Example | Monomers | Mw |
| --- | --- | --- |
| 55 | 53% Ethyl Vinyl Ether 47% Vinylanisole | 38,900 |
| 56 | 97.9% Vinylcyclohexene Epoxide 2.1% β-Pinene | 39,900 |

Examples 57-A to O

The table below shows polymerizations of various monomers using a variety of catalyst systems and solvents to give the appropriate copolymers. Each example lists the monomers, the catalyst system and reference is made to the Example number whose procedure is followed, using the same molar ratios of the various components and solvent, unless a different solvent is indicated.

| Monomer | Catalyst System/Solvent | Procedure |
|---|---|---|
| A) Norbornene β-Propiolactone | Ni ethyl hexanoate; B(C₆F₅)₃; AlEt₃ | Ex. 42 |
| B) Norbornene β-Propiolactone | Ni ethyl hexanoate; B(C₆F₅)₃; AlEt₃ | Ex. 41 |
| C) Norbornene β-Propiolactone | Catalyst A; BF₃.Et₂O; AlEt₃ | Ex. 3 |
| D) Norbornene β-Propiolactone | Catalyst A; BF₃.Et₂O; AlEt₃, 1,2-Dichloroethane | Ex. 3 |
| E) Norbornene β-Propiolactone | Catalyst G; B(C₆F₅)₃; AlEt₃ | Ex. 41 |
| F) Norbornene Indene | Ni ethyl hexanoate; B(C₆F₅)₃; AlEt₃ | Ex. 42 |
| G) Norbornene Indene | Ni ethyl hexanoate; AlEtCl₂ | Ex. 35 |
| H) Norbornene Indene | Ni ethyl hexanoate; AlEtCl₂/Cyclohexane | Ex. 35 |
| I) Norbornene Indene | Ni ethyl hexanoate; BF₃.Et₂O; AlEt₃ | Ex. 35 |
| J) Norbornene Indene | Ni ethyl hexanoate; BF₃.Et₂O; AlEt₃/monochlorobennne | Ex. 35 |
| K) Norbornene Indene | Catalyst A; BF₃.Et₂O; AlEt₃ | Ex. 3 |
| L) Norbornene Indene | Catalyst B | Ex. 18 |
| M) Norbornene, Indene | Catalyst H | Ex. 18 |
| N) Norbornene Indene | Catalyst G; BF₃.Et₂O; AlEt₃ | Ex. 18 |
| O) Norbornene Isobutyl vinyl ether | Ni ethyl hexanoate; B(C₆F₅)₃; AlEt₃ | Ex. 42 |
| P) Norbornene Cyclohexyl vinyl ether | Ni ethyl hexanoate; B(C₆F₅)₃; AlEt₃ | Ex. 42 |
| Q) Norbornene Chloroethyl vinyl ether | Catalyst G; B(C₆F₅)₃; AlEt₃ | Ex. 41 |

Example 58

Copolymer of the n-Butylester of 5-norbornene-2-methanol and Ethyl vinyl ether

To a 50 ml glass vial equipped with a Teflon® coated stirbar is added the n-butyl ester of 5-norbornene-2-methanol (exo, endo 20/80) (23.5 mmol), 1,2-dichloroethane (40 ml) and ethyl vinyl ether (5.3 mmol). To this stirred solution at ambient temperature is added a catalyst solution prepared by reacting catalyst components methoxynorbornenylpalladium chloride dimer (73 mg, 138 µmol) with silver hexafluoroantimonate (95 mg, 277 µmol) in 1,2-dichloroethane (3 ml) for 30 minutes and then filtering through a micropore filter. The reaction is allowed to run for 16 hours before the reactor contents are poured into an excess of methanol. The polymer is washed with excess methanol and dried. Following this procedure copolymers of the above functional NB and vinyl anisole and butadiene are also prepared.

Example 59

Copolymer of the Phenyl cinnamateester of 5-norbornene-2-methanol and Vinyl acetate To a 50 ml glass vial equipped with a Teflon® coated stirbar is added the phenyl cinnamateester of 5-norbornene-2-methanol (23 mmol), 1,2-dichloroethane (40 ml) and vinyl cyclohexene epoxide (5.3 mmol). To this stirred solution at ambient temperature is added a catalyst solution prepared by reacting norbornadienepalladium dichloride (38 mg, 141 µmol) with silver hexafluoroantimonate (96 mg, 279 µmol) in 1,2-dichloroethane (3 ml) for 30 minutes and then filtering through a micropore filter. The reaction is allowed to run for 16 hours before the reactor contents are poured into an excess of methanol. The polymer is washed with excess methanol and dried. Following this procedure copolymers of the above functional NB and indene and vinyl anisole are also prepared.

Example 60

Copolymer of the Octanoic ester of 5-norbornene-2-methanol and Butadiene

To a 100 ml glass vial equipped with a Teflon® coated stirbar is added octanoic ester of 5-norbornene-2-methanol (44 mmol), 1,2-dichloroethane (50 ml) and butadiene (4.8 mmol). To this stirred solution at ambient temperature is added a catalyst solution prepared by reacting allylpalladium chloride dimer (9 mg, 25 µmol) with silver hexafluoroantimonate (18 mg, 52 µmol) in 1,2-dichloroethane (3 ml) for 30 minutes and then filtering through a micropore filter. The reaction is allowed to run for 20 hours before the reactor contents are poured into an excess of methanol. The polymer is washed with excess methanol and dried. Following this procedure, copolymers of the above functional NB and vinyl cyclohexene epoxide and isobutylene are prepared.

Example 61

Copolymer of the phenylcinnamateester of 5-norbornene-2-methanol and Indene

To a 100 ml glass vial equipped with a Teflon® coated stirbar is added the phenylcinnamateester of 5-norbornene-2-methanol (22.4 mmol), 1,2-dichloroethane (30 ml) and indene (4 mmol). To this stirred solution at ambient temperature is added a catalyst solution prepared by reacting allylpalladium chloride dimer (36.7 mg, 100 µmol) with silver hexafluoroantimonate (76 mg, 208 µmol ) in 1,2-dichloroethane (3 ml) for 30 minutes and then filtering through a micropore filter. The reaction is allowed to run for 3.5 hours before the reactor contents are poured into an excess of methanol. The polymer is washed with excess methanol and dried in a vacuum oven overnight at 80° C.

We claim:

1. A copolymer containing repeating units derived from
   a) 0.1 to 99.9 weight percent of at least one norbornene-type monomer which undergoes substantially exclusively addition type polymerization, and
   b) 0.1 to 99.9 weight percent of at least one cationically polymerizable monomer excluding 3-methyl-1-butene and 4-methyl-1-pentene said monomer containing substantially exclusively addition-type repeat units derived from the norbornene-type monomers.

2. A copolymer of claim 1 wherein
   a) said norbornene-type monomer is selected from a compound or a mixture of compounds i) represented by the formulae:

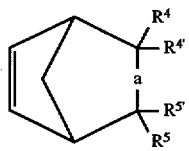

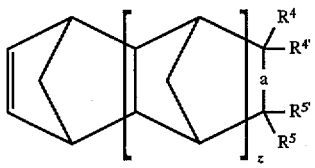

wherein $R^4$, $R^{4'}$, $R^5$ or $R^{5'}$ independently represent hydrogen, halogen, branched and unbranched ($C_1$-$C_{20}$) alkyl, ($C_1$-$C_{20}$) haloalkyl, substituted and unsubstituted cycloalkyl, ($C_1$-$C_6$) alkylidenyl provided that the carbon atom to which the alkylidene radical is attached cannot have another substituent, and when "a" is double bond said R groups cannot be alkylidene, ($C_6$-$C_{40}$) aryl, ($C_6$-$C_{40}$) haloaryl, ($C_7$-$C_{15}$) aralkyl, ($C_7$-$C_{15}$) haloaralkyl, ($C_2$-$C_{20}$) alkynyl, vinyl, ($C_3$-$C_{20}$) alkenyl, provided the alkenyl radical does not contain a terminal double bond, halogenated alkyl of the formula —$C_nF_{2n+1}$, wherein n is 1 to 20, $R^4$ and $R^5$ when taken with the two ring carbon atoms to which they are attached represent saturated or unsaturated cyclic groups containing 4 to 12 carbon atoms, "a" represents a single or double bond, and "z" is 1 to 5; and ii) functional norbornene-type monomers represented by the formula:

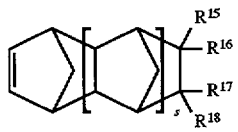

wherein s is 0 to 5, $R^{15}$ to $R^{18}$ independently represent hydrogen; hydrocarbyl selected from the group of linear and branched ($C_1$-$C_{20}$) alkyl, ($C_6$-$C_{12}$) aryl or aryl substituted with hydroxyl and alkyl having 1 to 4 carbon atoms, or functional substituent selected from the group —$(CH_2)_p$—OH, —$(CH_2)_p$—C(O)OH, $(CH_2)_p$—C(O)OR', —$(CH_2)_p$—$OR^{20}$, —$(CH_2)_p$—$OC(O)R^{20}$, —$(CH_2)_p$—$OC(O)OR^{20}$, —$(CH_2)_p$—$C(O)R^{20}$, —$(CH_2)_p$—O—$(CH_2)_p$OH, —$(CH_2)_p$—$OR^{20}$, wherein p independently is 0 to 24 and $R^{20}$ represents linear or branched ($C_1$-$C_{10}$) alkyl or the group

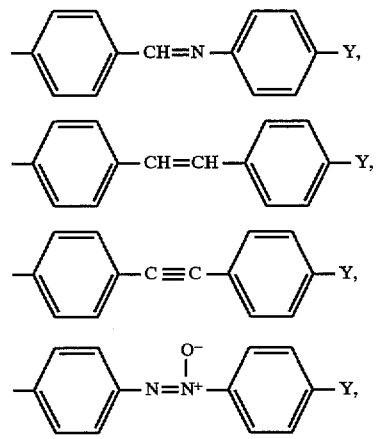

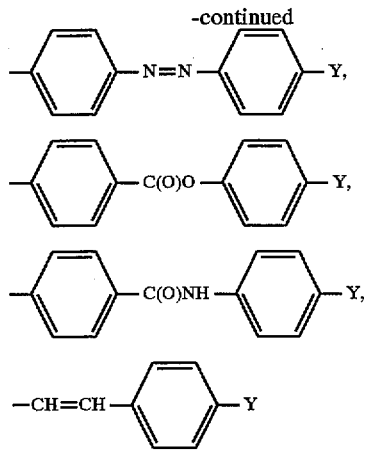

wherein Y is hydrogen, $C_rH_{2r+1}$, $C_rH_{2r+1}OC_rH_{2r+1}OC(O)$, or —CN wherein r is an integer from 1 to 12; any of $R^{15}$ and $R^{16}$ or $R^{17}$ and $R^{18}$ can be taken together to form ($C_1$-$C_{10}$) alkylidene group, $R^{15}$ and $R^{18}$ can be taken together with the ring carbon atoms to which they are attached to form an anhydride or dicarboxyimide group; and b) the cationically polymerizable monomer is selected from the group consisting of isoolefin, branched α-olefin excluding 3-methyl-1-butene and 4-methyl-1-pentene, conjugated olefin, bicyclo olefin, vinyl ether, cyclic ether, lactone and N-vinyl carbazole monomers.

3. A copolymer of claim 2 wherein the norbornene-type monomer is selected from the group consisting of (a) norbornene; (b) substituted norbornenes selected from the group consisting of branched and unbranched ($C_1$-$C_{20}$) alkylnorbornenes, branched and unbranched ($C_1$-$C_{20}$) haloalkylnorbornenes, ($C_1$-$C_6$) alkylidenylnorbornene, vinyl norbornene; (c) tetracyclododecene and substituted tetracyclododecenes selected from the group consisting of branched and unbranched ($C_1$-$C_{20}$) alkyltetracyclododecenes, ($C_1$-$C_6$) alkylidenyltetracyclododecenes; (d) dicyclopentadiene; (e) norbornadiene; (f) tetracyclododecadiene; (g) symmetrical and asymmetrical trimers of cyclopentadiene; and mixtures thereof.

4. A copolymer of claim 3 wherein the cationically polymerizable monomer is an isoolefin or a conjugated diene.

5. A copolymer of claim 4 containing
a) 1 to 25 weight percent of at least one norbornene-type monomer, and
b) 25 to 99 weight percent of said isoolefin or conjugated diene.

6. A copolymer of claim 4 containing
a) 75 to 95 weight percent of at least one norbornene-type monomer, and
b) 5 to 25 weight percent of said isoolefin or conjugated diene.

7. A copolymer of claim 4 containing 0.1 to 5 weight percent of a ($C_1$-$C_6$) alkylidenyl norbornene.

8. A copolymer of claim 7 wherein the isoolefin is isobutylene and the weight average molecular weight (Mw) of the copolymer is at least 100,000.

9. A copolymer of claim 4 wherein the copolymer has the weight average molecular weight (Mw) of from about 10,000 to about 50,000.

10. A copolymer of claim 9 wherein the cationically polymerizable monomer is isoolefin.

11. A copolymer of claim 2 wherein the cationically polymerizable monomer is vinyl ether.

12. A copolymer of claim 11 wherein the vinyl ether is alkyl vinyl ether.

13. A copolymer of claim 11 wherein the norbornene-type monomer is used in the amount of 50 to 90 weight percent.

14. A copolymer of claims 1, 4 or 11 wherein the repeating units derived from norbornene-type monomers is in the amount of from 50 to 90 weight percent.

15. A copolymer containing repeating units derived from a) 0.1 to 99.9 weight percent of at least one norbornene-type monomer, and b) 0.1 to 99.9 weight percent of a comonomer selected from the group consisting of α-methylstyrene, para-methoxystyrene and para-N,N-dimethylaminostyrene.

* * * * *